(12) United States Patent
Lee et al.

(10) Patent No.: US 11,485,800 B2
(45) Date of Patent: Nov. 1, 2022

(54) MODIFIED CONJUGATED DIENE-BASED POLYMER AND RUBBER COMPOSITION INCLUDING THE SAME

(71) Applicant: LG Chem, Ltd., Seoul (KR)

(72) Inventors: Tae Chul Lee, Daejeon (KR); Min Soo Kim, Daejeon (KR); Ki Seok Son, Daejeon (KR); No Ma Kim, Daejeon (KR)

(73) Assignee: LG Chem, Ltd.

( * ) Notice: Subject to any disclaimer, the term of this patent is extended or adjusted under 35 U.S.C. 154(b) by 64 days.

(21) Appl. No.: 16/754,985

(22) PCT Filed: May 8, 2019

(86) PCT No.: PCT/KR2019/005482
§ 371 (c)(1),
(2) Date: Apr. 9, 2020

(87) PCT Pub. No.: WO2019/216636
PCT Pub. Date: Nov. 14, 2019

(65) Prior Publication Data
US 2021/0079124 A1    Mar. 18, 2021

(30) Foreign Application Priority Data
May 8, 2018 (KR) .................. 10-2018-0052412

(51) Int. Cl.
| C08F 279/02 | (2006.01) |
| C08C 19/44 | (2006.01) |
| C08C 19/22 | (2006.01) |
| C08C 19/25 | (2006.01) |
| C08K 3/04 | (2006.01) |
| C08K 3/36 | (2006.01) |

(52) U.S. Cl.
CPC .............. C08C 19/44 (2013.01); C08C 19/22 (2013.01); C08C 19/25 (2013.01); C08F 279/02 (2013.01); C08K 3/04 (2013.01); C08K 3/36 (2013.01)

(58) Field of Classification Search
CPC ......... C08C 19/44; C08C 19/22; C08C 19/25; C08F 279/02; C08K 3/04; C08K 3/36
USPC ....................................................... 524/547
See application file for complete search history.

(56) References Cited

U.S. PATENT DOCUMENTS

| 4,397,994 A | 8/1983 | Takeuchi et al. |
| 2004/0254301 A1 | 12/2004 | Tsukimawashi et al. |
| 2012/0220716 A1 | 8/2012 | Nakatani et al. |
| 2016/0176993 A1 | 6/2016 | Dire et al. |
| 2018/0244819 A1 | 8/2018 | Kim et al. |
| 2018/0258194 A1 | 9/2018 | Sohn et al. |
| 2019/0153124 A1 | 5/2019 | Seo et al. |

FOREIGN PATENT DOCUMENTS

| CN | 1578790 A | | 2/2005 | |
| CN | 108026221 A | | 5/2018 | |
| CN | 108350118 A | | 7/2018 | |
| EP | 1942120 A1 | | 7/2008 | |
| EP | 2045272 A1 | | 4/2009 | |
| EP | 3030586 A1 | | 6/2016 | |
| JP | 2012224768 A | | 11/2012 | |
| JP | 2014055264 A | | 3/2014 | |
| KR | 100932356 | * | 12/2000 | |
| KR | 100932356 B1 | | 12/2009 | |
| KR | 20120083387 A | | 7/2012 | |
| KR | 20160062950 A | | 6/2016 | |
| KR | 20170073474 A | | 6/2017 | |
| KR | 20170073475 A | * | 6/2017 | |
| KR | 20170121694 A | | 11/2017 | |
| KR | 20170121694 A | * | 11/2017 | ............ C08C 19/44 |
| KR | 20180018175 A | | 2/2018 | |
| WO | 2015018774 A1 | | 2/2015 | |
| WO | 2017111463 A1 | | 6/2017 | |
| WO | 2017188641 A2 | | 11/2017 | |

OTHER PUBLICATIONS

International Search Report from Application No. PCT/KR2019/005482 dated Aug. 14, 2019, 3 pages.
Extended European Search Report including Written Opinion for Application No. EP19798869.4, dated Oct. 23, 2020, pp. 1-6.
Search Report dated Jun. 1, 2022 from Office Action for Chinese Application No. 201980005076.4 dated Jun. 8, 2022. 2 pgs.

* cited by examiner

*Primary Examiner* — Kelechi C Egwim
(74) *Attorney, Agent, or Firm* — Lerner, David, Littenberg, Krumholz & Mentlik, LLP

(57) ABSTRACT

A modified conjugated diene-based polymer and a rubber composition including the same are disclosed herein. In some embodiments, the modified conjugated diene-based polymer includes a functional group derived from a modification monomer represented by Formula 1 and a functional group derived from a modifier, and the polymer has a unimodal molecular weight distribution, and a polydispersity index of 1.0 to less than 1.7. The polymer has excellent processability, tensile properties and viscoelasticity properties.

11 Claims, 2 Drawing Sheets

MODIFIED CONJUGATED DIENE-BASED POLYMER AND RUBBER COMPOSITION INCLUDING THE SAME

CROSS-REFERENCE TO RELATED APPLICATIONS

The present application is a national phase entry under 35 U.S.C. § 371 of International Application No. PCT/KR2019/005482, filed on May 8, 2019, which claims priority from Korean Patent Application No. 10-2018-0052412, filed on May 8, 2018, the entire contents of which are incorporated by reference herein.

TECHNICAL FIELD

The present invention relates to a modified conjugated diene-based polymer which has excellent processability and good tensile strength and viscoelasticity properties, and a rubber composition including the same.

BACKGROUND ART

According to the recent demand for cars having a low fuel consumption ratio, a conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers or copolymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

If the solution-polymerized SBR is used as the rubber material for tires, since a glass transition temperature of the rubber is increased by increasing the vinyl content in the SBR, physical properties such as running resistance and braking force, required for tires may be controlled, and fuel consumption may be reduced by appropriately adjusting the glass transition temperature. The solution-polymerized SBR is prepared by using an anionic polymerization initiator and is being used by coupling or modifying the chain terminals of the polymer thus formed using various modifiers. For example, U.S. Pat. No. 4,397,994 discloses a method of coupling active anions of the chain terminals of a polymer obtained by polymerizing styrene-butadiene using alkyl-lithium which is a monofunctional initiator in a non-polar solvent, using a coupling agent such as a tin compound.

Meanwhile, the polymerization of SBR or BR may be conducted by batch-type or continuous-type polymerization. According to the batch-type polymerization, the polymer thus prepared has narrow molecular weight distribution and merits in view of the improvement of physical properties, but there are problems with low productivity and deteriorated processability. According to the continuous-type polymerization, polymerization is continuously carried out and there are merits in view of excellent productivity and the improvement of processability, but there are problems with wide molecular weight distribution and inferior physical properties. Therefore, research on improving productivity, processability and physical properties at the same time during preparing SBR or BR is continuously required.

DISCLOSURE OF THE INVENTION

Technical Problem

The present invention has been devised to solve the above-mentioned problems of the conventional technique, and an object of the present invention is to provide a modified conjugated diene-based polymer prepared by continuous-type polymerization and having excellent processability, good physical properties such as tensile properties, and excellent viscoelasticity, and a rubber composition including the same.

Technical Solution

To solve the above-described tasks, according to an embodiment of the present invention, the present invention provides a modified conjugated diene-based polymer having a unimodal molecular weight distribution, as indicated by a unimodal shape molecular weight distribution curve obtained by gel permeation chromatography (GPC), and polydispersity index (PDI) of 1.0 to less than 1.7, and including a functional group derived from a modification monomer represented by the following Formula 1 and a functional group derived from an aminoalkoxysilane-based modifier in at least one terminal:

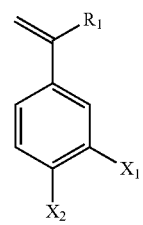

[Formula 1]

In Formula 1, $R_1$ is hydrogen or a monovalent hydrocarbon group of 1 to 20 carbon atoms, $X_1$ and $X_2$ are each independently hydrogen or $-O[CH_2CH_2O]_aCH_3$, where one among $X_1$ and $X_2$ is $-O[CH_2CH_2O]_aCH_3$ and the other one is hydrogen, and a is an integer of 1 to 11.

In addition, the present invention provides a rubber composition including the modified conjugated diene-based polymer and a filler.

Advantageous Effects

The modified conjugated diene-based polymer according to the present invention has a unimodal molecular weight distribution, as indicted by a unimodal shape molecular weight distribution curve obtained by gel permeation chromatography and narrow molecular weight distribution as defined by a polydispersity index of less than 1.7, and may have excellent processability and good tensile properties and viscoelasticity properties.

In addition, the modified conjugated diene-based polymer according to the present invention includes a functional group derived from a modification monomer and a functional group derived from a modifier in at least one terminal thereof, thereby further improving tensile properties and viscoelasticity properties.

BRIEF DESCRIPTION OF THE DRAWINGS

The accompanying drawings in the present disclosure illustrate particular embodiments of the present invention and are included together with the above description to provide a further understanding of the inventive concept. The inventive concept, however, should not be construed as limited to the accompanying drawings.

BEST MODE FOR CARRYING OUT THE INVENTION

Figure 1:
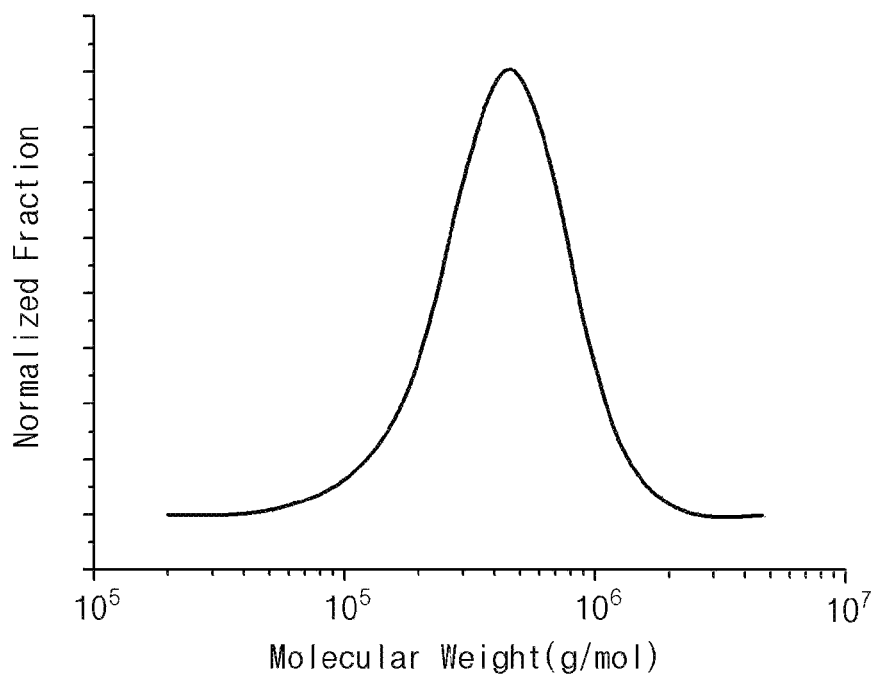
FIG. 1 illustrates a molecular weight distribution curve by gel permeation chromatography (GPC) of a modified conjugated diene-based polymer of Example 1 according to an embodiment of the present invention.

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The term "substituted" used in the present invention may mean the hydrogen of a functional group, an atomic group or a compound is substituted with a specific substituent. If the hydrogen of a functional group, an atomic group or a compound is substituted with a specific substituent, one or a plurality including two or more of substituents may be present according to the number of hydrogen present in the functional group, the atomic group or the compound, and if a plurality of substituents are present, each substituent may be the same or different.

The term "alkyl group" in the present invention may mean monovalent aliphatic saturated hydrocarbon, and may include a linear alkyl group such as methyl, ethyl, propyl and butyl; a branched alkyl group such as isopropyl, sec-butyl, tert-butyl and neo-pentyl; and a cyclic saturated hydrocarbon, or a cyclic unsaturated hydrocarbon group including one or two or more unsaturated bonds.

The term "alkylene group" used in the present invention may mean divalent aliphatic saturated hydrocarbon such as methylene, ethylene, propylene and butylene.

The term "cycloalkyl group" used in the present invention may mean cyclic saturated hydrocarbon.

The term "aryl group" used in the present invention may mean cyclic aromatic hydrocarbon, and may include both monocyclic aromatic hydrocarbon in which one ring is formed, and polycyclic aromatic hydrocarbon in which two or more rings are bonded.

The term "monovalent hydrocarbon group" used in the present invention represents a monovalent substituent derived from a hydrocarbon group, and may mean a monovalent atomic group in which carbon and hydrogen are bonded, such as an alkyl group, an alkenyl group, an alkynyl group, a cycloalkyl group, a cycloalkyl group including one or more unsaturated bonds, and an aryl group, and the monovalent atomic group may have a linear or branched structure according to the structure of the bond thereof.

The term "single bond" used in the present invention may mean a single covalent bond itself excluding a separate atomic or molecular group.

The term "derived unit" and "derived functional group" used in the present invention may represent a component or a structure comes from a certain material, or the material itself.

The present invention provides a modified conjugated diene-based polymer having excellent processability and good tensile properties and viscoelasticity properties.

The modified conjugated diene-based polymer according to an embodiment of the present invention has unimodal molecular weight distribution, as indicated by a unimodal shape molecular weight distribution curve by gel permeation chromatography (GPC) and polydispersity index (PDI) of 1.0 to less than 1.7, and includes a functional group derived from a modification monomer represented by the following Formula 1 and a functional group derived from an aminoalkoxysilane-based modifier in at least one terminal:

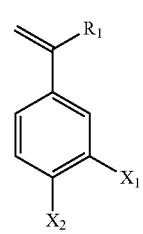

[Formula 1]

In Formula 1, $R_1$ is hydrogen or a monovalent hydrocarbon group of 1 to 20 carbon atoms, $X_1$ and $X_2$ are each independently hydrogen or $-O[CH_2CH_2O]_aCH_3$, where one among $X_1$ and $X_2$ is $-O[CH_2CH_2O]_aCH_3$ and the other one is hydrogen, and a is an integer of 1 to 11.

According to an embodiment of the present invention, the modified conjugated diene-based polymer may include a repeating unit derived from a conjugated diene-based monomer, a functional group derived from a modification monomer and a functional group derived from a modifier. The repeating unit derived from a conjugated diene-based monomer may mean a repeating unit formed by a conjugated diene-based monomer during polymerization, the functional group derived from a modification monomer and the functional group derived from a modifier may mean functional groups derived from a modification monomer and a functional group derived from a modifier, respectively, which are present at each polymer chain.

In addition, the functional group derived from a modification monomer may be present in a polymer chain or in at least one terminal of the polymer chain, and in case where the functional group derived from a modification monomer is present at one terminal of the polymer chain, the functional group derived from a modification monomer may be present at one terminal of the polymer chain, and the functional group derived from a modifier may be present at the other terminal. That is, in this case, the modified conjugated diene-based polymer according to an embodiment of the present invention may be a both terminal modified conjugated diene-based polymer of which both terminals are modified.

In addition, according to another embodiment of the present invention, the modified conjugated diene-based polymer may be a copolymer including a repeating unit derived from a conjugated diene-based monomer, a repeating unit derived from an aromatic vinyl-based monomer, a functional group derived from a modification monomer and a functional group derived from a modifier. Here, the repeating unit derived from an aromatic vinyl-based monomer may mean a repeating unit formed by an aromatic vinyl-based monomer during polymerization.

According to an embodiment of the present invention, the conjugated diene-based monomer may be one or more selected from the group consisting of 1,3-butadiene, 2,3-dimethyl-1,3-butadiene, piperylene, 3-butyl-1,3-octadiene, isoprene, 2-phenyl-1,3-butadiene and 2-halo-1,3-butadiene (halo means a halogen atom).

The aromatic vinyl-based monomer may include, for example, one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl) styrene, 1-vinyl-5-hexylnaphthalene, 3-(2-pyrrolidino ethyl)styrene, 4-(2-pyrrolidino ethyl) styrene and 3-(2-pyrrolidino-1-methyl ethyl)-α-methylstyrene.

In another embodiment, the modified conjugated diene-based polymer may be a copolymer which further including a repeating unit derived from a diene-based monomer of 1 to 10 carbon atoms together with the repeating unit derived from the conjugated diene-based monomer. The repeating unit derived from the diene-based monomer may be a repeating unit derived from a diene-based monomer which is different from the conjugated diene-based monomer, and the diene-based monomer which is different from the conjugated diene-based monomer may be, for example, 1,2-butadiene. If the modified conjugated diene-based polymer is a copolymer further including a diene-based monomer, the modified conjugated diene-based polymer may include the repeating unit derived from the diene-based monomer in an amount of greater than 0 wt % to 1 wt %, greater than 0 wt % to 0.1 wt %, greater than 0 wt % to 0.01 wt %, or greater than 0 wt % to 0.001 wt %, and within this range, effects of preventing gel formation may be achieved.

According to an embodiment of the present invention, the copolymer may be a random copolymer, and in this case, effects of excellent balance between physical properties may be achieved. The random copolymer may mean the arrangement of repeating units forming a copolymer in disorder.

The modified conjugated diene-based polymer according to an embodiment of the present invention may have a number average molecular weight (Mn) of 1,000 g/mol to 2,000,000 g/mol, 10,000 g/mol to 1,000,000 g/mol, or 100,000 g/mol to 800,000 g/mol, a weight average molecular weight (Mw) of 1,000 g/mol to 3,000,000 g/mol, 10,000 g/mol to 2,000,000 g/mol, or 100,000 g/mol to 2,000,000 g/mol, and a peak average molecular weight (Mp) of 1,000 g/mol to 3,000,000 g/mol, 10,000 g/mol to 2,000,000 g/mol, or 100,000 g/mol to 2,000,000 g/mol. Within these ranges, effects of excellent rolling resistance and wet skid resistance may be achieved. In another embodiment, the modified conjugated diene-based polymer may have polydispersity index (PDI; Mw/Mn) of 1.0 to less than 1.7, or 1.1 to less than 1.7, and within this range, effects of excellent tensile properties, viscoelasticity properties, and balance between physical properties may be achieved. At the same time, the modified conjugated diene-based polymer has a unimodal molecular weight distribution, as indicated by a unimodal shape molecular weight distribution curve obtained by gel permeation chromatography (GPC), which corresponds to molecular weight distribution shown by a polymer prepared by continuous-type polymerization and may indicate that the modified conjugated diene-based polymer has uniform properties. That is, the modified conjugated diene-based polymer according to an embodiment of the present invention is prepared by continuous-type polymerization, and thus, has a unimodal molecular weight distribution and polydispersity index of 1.0 to less than 1.7.

Generally, in case of preparing a conjugated diene-based polymer and performing modification reaction by a batch type polymerization method, the molecular weight distribution curve of the modified conjugated diene-based polymer thus prepared has a multimodal which is a bimodal or higher molecular weight distribution curve. Particularly, in case of the batch type polymerization, polymerization reaction may be initiated after injecting all raw materials and the propagation of chains may be carried out at various initiation points simultaneously due to a plurality of initiators, and accordingly, the molecular weight of the polymer chains thus prepared may be constant and a unimodal shape having significantly narrow molecular weight distribution may be obtained. However, in case of performing modification reaction by injecting a modifier, two cases of "un-modification" and "achieving modification and coupling" may arise, and accordingly, two groups having a large molecular weight difference may be formed in the polymer chains, and as a result, a multimodal molecular weight distribution curve having two or more peaks in a molecular weight distribution curve may be formed. Meanwhile, in case of a continuous type polymerization method according to an embodiment of the present invention, different from the batch type polymerization, the initiation of reaction and the injection of raw materials are conducted continuously, the generation points of initiation points when the reaction is initiated, are different. Accordingly, the initiation points of polymerization are diverse including the initial stage of reaction, the middle stage of reaction, the last stage of reaction, etc., and after finishing polymerization reaction, polymer chains having diverse molecular weights are prepared. Accordingly, a specific peak is not dominant in a curve showing molecular weight distribution and the curve showing molecular weight distribution is wide as a single peak, and though chains of which polymerization are initiated at the last stage of the reaction are coupled, the molecular weight thereof may be similar to that of a chain of which polymerization is initiated at the initial stage, and thus, the diversity of molecular weight distribution may be kept same, and generally, the unimodal distribution curve may be still maintained.

Modification conditions may be controlled so as to have the unimodal shape in case of preparing and modifying a polymer by the batch type polymerization method, but in this case, the uncoupling of entire polymer is required or the coupling of entire polymer is required, and otherwise, a unimodal molecular weight distribution curve may not be shown.

In addition, in case where the entire polymer is coupled as the case where the molecular weight distribution curve of the modified conjugated diene-based polymer shows unimodal distribution though being prepared by the batch type polymerization method as described above, only polymers having equivalent degree of molecular weight are present and processability may be inferior and compounding properties may be inferior, because functional groups which may interact with a filler such as silica and carbon black may decrease via coupling. On the contrary, in case where the entire polymer is uncoupled, functional groups at the terminal of a polymer, which are required to make interaction with a filler such as silica and carbon black during processing, preferably interact with each other to arise the preventing phenomenon of interaction with a filler and significantly deteriorate processability. In the end, in case of controlling to have a unimodal shape molecular weight distribution curve while preparing a polymer by a batch type polymerization method, the processability and compounding properties of the modified conjugated diene-based polymer thus prepared may be deteriorated, and particularly, the processability may be significantly deteriorated.

Meanwhile, the coupling of the modified conjugated diene-based polymer may be confirmed by a coupling number (C.N), and here, the coupling number is a value dependent on the number of functional groups to which a polymer present in a modifier may make coupling. That is, the coupling number represents the ratio of a polymer only composed of terminal modification without coupling between polymer chains and a polymer in which a plurality of polymer chains are coupled with one modifier, and may have a range of 1≤C.N.≤F, where F means the number of functional groups which may react with an active polymer terminal in a modifier. In other words, a modified conjugated diene-based polymer having a coupling number of 1 means that the entire polymer chain is uncoupled, and the modified conjugated diene-based polymer having the coupling number of F means that the entire polymer chain is coupled.

Accordingly, the modified conjugated diene-based polymer according to an embodiment of the present invention may have a unimodal shape molecular weight distribution curve, and the coupling number may be greater than 1 and less than the number of functional groups of the modifier used (1<C.N.<F).

In another embodiment, the modified conjugated diene-based polymer may have the Si content based on a weight of 50 ppm or more, 100 ppm or more, 100 ppm to 10,000 ppm, or 100 ppm to 5,000 ppm, and within this range, a rubber composition including the modified conjugated diene-based polymer has effects of showing excellent mechanical properties such as tensile properties and viscoelasticity properties. The Si content may mean the amount of Si atoms present in the modified conjugated diene-based polymer. Meanwhile, the Si atom may be derived from the functional group derived from a modifier.

In another embodiment, the modified conjugated diene-based polymer may have the N content based of a weight of 50 ppm or more, 100 ppm or more, 100 ppm to 10,000 ppm or 100 ppm to 5,000 ppm, and within this range, a rubber composition including the modified conjugated diene-based polymer has effects of showing excellent mechanical properties such as tensile properties and viscoelasticity properties. The N content may mean the amount of N atoms present in the modified conjugated diene-based polymer, and in this case, the N atom may be derived from the functional group derived from a modifier.

The Si content may be measured via, for example, an inductively coupled plasma (ICP) analysis method, and may be measured by the ICP analysis method using an inductively coupled plasma optical emission spectroscopy (ICP-OES; Optima 7300DV). If the inductively coupled plasma optical emission spectroscopy is used, measurement may be performed by adding about 0.7 g of a specimen to a platinum (Pt) crucible, adding about 1 mL of concentrated sulfuric acid (98 wt %, electronic grade) thereto, heating at 300° C. for 3 hours, incinerating the specimen in an electrical furnace (Thermo Scientific, Lindberg Blue M) by the following program of steps 1 to 3:

1) step 1: initial temp 0° C., rate (temp/hr) 180° C./hr, temp (holdtime) 180° C. (1 hr), 2) step 2: initial temp 180° C., rate (temp/hr) 85° C./hr, temp (holdtime) 370° C. (2 hr), and 3) step 3: initial temp 370° C., rate (temp/hr) 47° C./hr, temp (holdtime) 510° C. (3 hr), adding 1 mL of concentrated nitric acid (48 wt %) and 20 µl of concentrated hydrofluoric acid (50 wt %) to a residue, sealing the platinum crucible and shaking for 30 minutes or more, adding 1 mL of boric acid to the specimen, storing at 0° C. for 2 hours or more, diluting in 30 ml ultrapure water, and performing incineration.

In this case, the specimen is a modified conjugated diene-based polymer from which solvents are removed by putting the specimen in hot water heated by steam and stirring, and remaining monomer, remaining modifier and oil are removed therefrom.

In addition, the N content may be measured, for example, through an NSX analysis method, and measurement by the NSX analysis method may use a quantitative analyzer of a trace amount of nitrogen (NSX-2100H).

For example, in case of using the quantitative analyzer of a trace amount of nitrogen, the quantitative analyzer of a trace amount of nitrogen (Auto sampler, Horizontal furnace, PMT & Nitrogen detector) was turned on, carrier gas flow amounts were set to 250 ml/min for Ar, 350 ml/min for $O_2$, and 300 ml/min for ozonizer, a heater was set to 800° C., and the analyzer was stood for about 3 hours for stabilization. After stabilizing the analyzer, a calibration curve of calibration curve ranges of 5 ppm, 10 ppm, 50 ppm, 100 ppm and 500 ppm was made using Nitrogen standard (AccuStandard S-22750-01-5 ml), and an area corresponding to each concentration was obtained. Then, by using the ratios of concentrations to areas, a straight line was made. After that, a ceramic boat holding 20 mg of a specimen was put in the auto sampler of the analyzer and measurement was conducted to obtain an area. By using the area of the specimen thus obtained and the calibration curve, the N content was calculated.

In this case, the specimen used for the NSX analysis method is a modified conjugated diene-based polymer specimen from which solvents are removed by putting the specimen in hot water heated by steam and stirring, and may be a specimen from which remaining monomer and remaining modifier are removed. In addition, if oil is added to the specimen, the specimen may be a specimen after extracting (removing) oil.

In another embodiment, the modified conjugated diene-based polymer may have a mooney relaxation ratio measured at 100° C. of 0.7 or more, 0.7 to 3.0, 0.7 to 2.5, or 0.7 to 2.0.

Here, the mooney relaxation ratio represents the stress change shown as the response to the same amount of strain, and may be measured using a mooney viscometer. Particularly, the mooney relaxation ratio was obtained using a large rotor of MV2000E of Monsanto Co. in conditions of 100° C. and a rotor speed of 2±0.02 rpm, by standing a polymer at room temperature (23±3° C.) for 30 minutes or more, collecting 27±3 g of the polymer and putting in a die cavity, applying torque by operating a Platen and measuring mooney viscosity, and measuring the slope value of the change of the mooney viscosity shown while releasing torque.

Meanwhile, the mooney relaxation ratio may be used as the index of the branch structure of a corresponding polymer. For example, in case of comparing polymers having the same mooney viscosity, the mooney relaxation ratio decreases with the increase of branching and may be used as the index of the degree of branching.

In addition, the modified conjugated diene-based polymer may have the mooney viscosity at 100° C. of 30 or more, 40 to 150, or 40 to 140, and within this range, effects of excellent processability and productivity are achieved.

In another embodiment, a shrinking factor (g') of the modified conjugated diene-based polymer, obtained by a gel permeation chromatography-light scattering method equipped with a viscosity detector may be 0.8 or more, particularly, 0.8 to 3.0, more particularly, 0.8 to 1.3.

Here, the shrinking factor (g') obtained through the measurement by the gel permeation chromatography-light scattering method is a ratio of the intrinsic viscosity of a linear polymer and the intrinsic viscosity of a branched polymer, which have the same absolute molecular weight, and may be used as the index of the branch structure of the branched polymer, that is, the index of the ratio occupied by branches. For example, according to the decrease of the shrinking factor, the number of branches of the corresponding polymer tends to increase, and accordingly, in case of comparing polymers having the same absolute molecular weight, the shrinking factor decreases with the increase of the branches, and the shrinking factor may be used as the index of the degree of branching.

In addition, the shrinking factor is obtained by measuring chromatogram using a gel chromatography-light scattering measurement apparatus equipped with a viscosity detector and computing based on solution viscosity and a light scattering method, and particularly, absolute molecular weights and intrinsic viscosity corresponding to each absolute molecular weight were obtained using a GPC-light scattering measurement apparatus equipped with a light scattering detector in which two columns using a polystyrene gel as a filler are connected and a viscosity detector, the intrinsic viscosity of a linear polymer corresponding to the absolute molecular weight was computed, and the shrinking factor was obtained as a ratio of intrinsic viscosity corresponding to each absolute molecular weight. For example, the shrinking factor was shown by obtaining absolute molecular weights from a light scattering detector by injecting a specimen into a GPC-light scattering measurement apparatus (Viscotek TDAmax, Malvern Co.) equipped with a light scattering detector and a viscosity detector, obtaining intrinsic viscosity [η] on the absolute molecular weight from the light scattering detector and the viscosity detector, computing the intrinsic viscosity $[\eta]_0$ on the absolute molecular weight corresponding to each absolute molecular weight through Mathematical Equation 2 below, and showing an average value of the ratio of intrinsic viscosity $([\eta]/[\eta]_0)$ corresponding to each absolute molecular weight as the shrinking factor. In this case, a mixture solution of tetrahydrofuran and N,N,N',N'-tetramethylethylenediamine (controlled by mixing 20 mL of N,N,N',N'-tetramethylethylenediamine with 1 L of tetrahydrofuran) was used as an eluent, PL Olexix (Agilent Co.) was used as a column, measurement was conducted under conditions of an oven temperature of 40° C. and a THF flow rate of 1.0 mL/min, and a specimen was prepared by dissolving 15 mg of a polymer in 10 mL of THF.

$$[\eta]_0 = 10^{-3.883} M^{0.771} \qquad \text{[Mathematical Equation 2]}$$

In Mathematical Equation 2, M is an absolute molecular weight.

In addition, the modified conjugated diene-based polymer may have the vinyl content of 5 wt % or more, 10 wt % or more, or 10 wt % to 60 wt %. Here, the vinyl content may mean the amount of not 1,4-added but 1,2-added conjugated diene-based monomer based on 100 wt % of a conjugated diene-based copolymer composed of a monomer having a vinyl group and an aromatic vinyl-based monomer.

Meanwhile, the modification monomer represented by Formula 1 according to an embodiment of the present invention may be polymerized with another monomer to form a polymer chain and introduce a functional group into the polymer chain.

Particularly, in Formula 1, $R_1$ may be hydrogen, an alkyl group of 1 to 20 carbon atoms, a cycloalkyl group of 3 to 20 carbon atoms, an aryl group of 6 to 20 carbon atoms, an arylalkyl group of 7 to 20 carbon atoms, an alkoxy group of 1 to 20 carbon atoms, an alkoxyalkyl group of 2 to 20 carbon atoms or a phenoxyalkyl group of 7 to 20 carbon atoms.

In addition, in Formula 1, $X_1$ and $X_2$ may be each independently hydrogen, or $-O[CH_2CH_2O]_a CH_3$, where one of both may be $-O[CH_2CH_2O]_a CH_3$, and the other one may be hydrogen, and a may be an integer of 1 to 6.

That is, in the present invention, Formula 1 may be a meta benzene ring in which position 1 and position 3 are substituted, or a para benzene ring compound in which position 1 and position 4 are substituted.

More particularly, in Formula 1, $R_1$ may be hydrogen, $X_1$ and $X_2$ may be each independently hydrogen, or $-O[CH_2CH_2O]_a CH_3$, where one of both may be $-O[CH_2CH_2O]_a CH_3$, and the other one may be hydrogen, and a may be an integer of 1 to 6.

Meanwhile, the modification monomer represented by Formula 1 according to an embodiment of the present invention may be prepared by reacting substituted or unsubstituted 3- or 4-hydroxystyrene with $Z[CH_2CH_2O]_a CH_3$ in an organic solvent such as acetonitrile, where Z may be Cl or Br. In addition, the substituted or unsubstituted 3- or 4-hydroxystyrene and $Z[CH_2CH_2O]_a CH_3$ may be reacted in a molar ratio of 1:1 to 1:2.5.

In addition, the modifier according to the present invention may be a modifier for modifying at least one terminal of the conjugated diene-based polymer, and particular example may include a modifier having affinity with silica. The modifier having affinity with silica may mean a modifier containing a functional group having affinity with silica in a compound used as the modifier, and the functional group having affinity with silica may mean a functional group having excellent affinity with a filler, particularly, with a silica-based filler, and possibly making interaction between the silica-based filler and the functional group derived from the modifier.

Particularly, according to an embodiment of the present invention, the aminoalkoxysilane-based modifier may be selected from the compounds represented by Formula 2 or Formula 3 below.

$$(R_{a5}-R_{a4})_{n2}-N-(R_{a1}-Si(OR_{a2})_{n1}(R_{a3})_{3-n1})_{3-n2} \quad [\text{Formula 2}]$$

In Formula 2, $R_{a1}$ and $R_{a0}$ are each independently a single bond, or an alkylene group of 1 to 10 carbon atoms, $R_{a2}$ and $R_{a3}$ are each independently an alkyl group of 1 to 10 carbon atoms, $R_{a5}$ is a hydrogen atom, an alkyl group of 1 to 10 carbon atoms or a divalent, trivalent or tetravalent alkylsilyl group which is substituted with an alkyl group of 1 to 10 carbon atoms, $n_1$ is an integer of 1 to 3, and $n_2$ is an integer of 0 to 2,

[Formula 3]

$$\begin{array}{c} R_{b1} \quad R_{b3} \\ | \quad | \\ O \quad O \\ L_1 \quad | \quad | \quad L_3 \\ \diagdown \quad | \quad | \quad \diagup \\ N-A_1-Si-O-Si-A_2-N \\ \diagup \quad | \quad | \quad \diagdown \\ L_2 \quad O \quad O \quad L_4 \\ | \quad | \\ R_{b2} \quad R_{b4} \end{array}$$

In Formula 3, $A_1$ and $A_2$ are each independently an alkylene group of 1 to 20 carbon atoms, and $R_{b1}$ to $R_{b4}$ are each independently an alkyl group of 1 to 20 carbon atoms.

$L_1$ to $L_4$ are each independently an alkyl group of 1 to 20 carbon atoms, an aryl group of 6 to 20 carbon atoms, or a divalent, trivalent or tetravalent alkylsilyl group which is substituted with an alkyl group of 1 to 10 carbon atoms.

Particularly, the aminoalkoxysilane-based modifier according to an embodiment of the present invention may be a compound represented by Formula 2, and in Formula 2, $R_{a1}$ and $R_{a4}$ are each independently a single bond, or an alkylene group of 1 to 5 carbon atoms, $R_{a2}$ and $R_{a1}$ are each independently an alkyl group of 1 to 5 carbon atoms, $R_a$s may be a hydrogen atom, an alkyl group of 1 to 5 carbon atoms, or a tetravalent alkylsilyl group which is substituted with an alkyl group of 1 to 5 carbon atoms, $n_1$ is an integer of 2 or 3, and $n_2$ may be an integer of 0 to 2.

More particularly, the compound represented by Formula 2 may be one or more selected from the group consisting of N,N-bis(3-(dimethoxy(methyl)silyl)propyl)-methyl-1-amine, N,N-bis(3-(diethoxy(methyl)silyl)propyl)-methyl-1-amine, N,N-bis(3-(trimethoxysilyl)propyl)-methyl-1-amine, N,N-bis(3-(triethoxysilyl)propyl)-methyl-1-amine, N,N-diethyl-3-(trimethoxysilyl)propan-1-amine, N,N-diethyl-3-(triethoxysilyl)propan-1-amine, tri(trimethoxysilyl)amine, tri-(3-(trimethoxysilyl)propyl) amine, N,N-bis(3-(diethoxy(methyl)silyl)propyl)-1,1,1-trimethlysilanamine, and 3-(dimethoxy(methyl)silyl)-N,N-diethylpropane-1-amine.

In addition, the aminoalkoxysilane-based modifier according to another embodiment of the present invention may be a compound represented by Formula 3, and in Formula 3, A1 and A2 are each independently an alkylene group of 1 to 10 carbon atoms, $R_{b1}$ to $R_{b4}$ are each independently an alkyl group of 1 to 10 carbon atoms, $L_1$ to $L_4$ may be each independently an alkyl group of 1 to 10 carbon atoms, an aryl group of 6 to 12 carbon atoms or a tetravalent alkylsilyl group which is substituted with an alkyl group of 1 to 5 carbon atoms.

More particularly, the compound represented by Formula 3 may be one or more selected from the group consisting of 3,3'-(1,1,3,3-tetramethoxydisiloxane-1,3-diyl)bis(N,N-dimethylpropan-1-amine, 3,3'-(1,1,3,3-tetraethoxydisiloxane-1,3-diyl)bis(N,N-dimethylpropan-1-amine), 3,3'-(1,1,3,3-tetrapropoxydisiloxane-1,3-diyl)bis(N,N-dimethylpropan-1-amine), 3,3'-(1,1,3,3-tetramethoxydisiloxane-1,3-diyl)bis(N,N-diethylpropan-1-amine), 3,3'-(1,1,3,3-tetramethoxydisiloxane-1,3-diyl)bis(N,N-dipropylpropan-1-amine), 3,3'-(1,1,3,3-tetraethoxydisiloxane-1,3-diyl)bis(N,N-diethylpropan-1-amine), 3,3'-(1,1,3,3-tetrapropoxydisiloxane-1,3-diyl)bis(N,N-diethylpropan-1-amine), 3,3'-(1,1,3,3-tetraethoxydisiloxane-1,3-diyl)bis(N,N-dipropylpropan-1-amine), 3,3'-(1,1,3,3-tetrapropoxydisiloxane-1,3-diyl)bis(N,N-dipropylpropan-1-amine), 3,3'-(1,1,3,3-tetramethoxydisiloxane-1,3-diyl)bis(N,N-diethylmethan-1-amine), 3,3'-(1,1,3,3-tetraethoxydisiloxane-1,3-diyl)bis(N,N-diethylmethan-1-amine), 3,3'-(1,1,3,3-tetrapropoxydisiloxane-1,3-diyl)bis(N,N-diethylmethan-1-amine), 3,3'-(1,1,3,3-tetramethoxydisiloxane-1,3-diyl)bis(N,N-dimethylmethan-1-amine), 3,3'-(1,1,3,3-tetramethoxydisiloxane-1,3-diyl)bis(N,N-dipropylmethan-1-amine), 3,3'-(1,1,3,3-tetrapropoxydisiloxane-1,3-diyl)bis(N,N-dimethylmethan-1-amine), 3,3'-(1,1,3,3-tetrapropoxydisiloxane-1,3-diyl)bis(N,N-dipropylmethan-1-amine), 3,3'-(1,1,3,3-tetraethoxydisiloxane-1,3-diyl)bis(N,N-dimethylmethan-1-amine), 3,3'-(1,1,3,3-tetraethoxydisiloxane-1,3-diyl)bis(N,N-dipropylmethan-1-amine), N,N'-((1,1,3,3-tetramethoxydisiloxane-1,3-diyl)bis(propan-3,1-diyl))bis(1,1,1-trimethyl-N-(trimethylsilyl)silanamine, N,N'-((1,1,3,3-tetraethoxydisiloxane-1,3-diyl)bis(propan-3,1-diyl))bis(1,1,1-trimethyl-N-(trimethylsilyl)silanamine, N,N'-((1,1,3,3-tetrapropoxydisiloxane-1,3-diyl)bis(propan-3,1-diyl))bis(1,1,1-trimethyl-N-(trimethylsilyl)silanamine, N,N'-((1,1,3,3-tetramethoxydisiloxane-1,3-diyl)bis(propan-3,1-diyl))bis(1,1,1-trimethyl-N-phenylsilanamine, N,N'-((1,1,3,3-tetraethoxydisiloxane-1,3-diyl)bis(propan-3,1-diyl))bis(1,1,1-trimethyl-N-phenylsilanamine, and N,N'-((1,1,3,3-tetrapropoxydisiloxane-1,3-diyl)bis(propan-3,1-diyl))bis(1,1,1-trimethyl-N-phenylsilanamine.

As described above, the modified conjugated diene-based polymer according to an embodiment of the present invention has a specific polymer structure and may have a unique molecular weight distribution diagram and shape. Such a polymer structure may be expressed by physical properties such as a shrinking factor, a mooney relaxation ratio and a coupling number, the molecular weight distribution diagram and shape may be expressed by a molecular weight distribution value, the shape of a molecular weight distribution curve and a coupling number, and both terminal modification by the modifier and the modification monomer may affect the structure, and the molecular weight distribution diagram and the shape thereof. Parameters expressing such polymer structure and properties related to the molecular weight distribution may be satisfied by a preparation method which will be described later.

In addition, though the preparation through such a preparation method is preferable in satisfying the above-described properties, in case where the above-described all properties are satisfied, effects trying to achieve in the present invention may be accomplished.

In addition, the present invention provides a method for preparing the modified conjugated diene-based polymer. The modified conjugated diene-based polymer according to an embodiment of the present invention is prepared by a preparation method which will be described later, and may have a unimodal molecular weight distribution, as indicated by a unimodal shape molecular weight distribution curve obtained by gel permeation chromatography and narrow molecular weight distribution as defined by a polydispersity index of 1.0 to less than 1.7. Accordingly, the modified conjugated diene-based polymer may have excellent processability and good tensile properties and viscoelasticity properties in balance.

The method for preparing the modified conjugated diene-based polymer according to an embodiment of the present invention includes a step of polymerizing a modification monomer represented by Formula 1 with a conjugated diene-based monomer or a conjugated diene-based monomer and an aromatic vinyl-based monomer in the presence of a polymerization initiator to prepare an active polymer which introduces a functional group derived from the modification monomer (S1); and a step of reacting or coupling the active polymer prepared in step (S1) with an aminoalkoxysilane-based modifier (S2), wherein step (S1) is continuously performed in two or more polymerization reactors, and a polymerization conversion ratio in a first reactor among the polymerization reactors may be 50% or less.

[Formula 1]

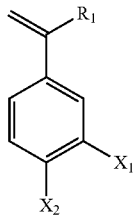

In Formula 1, $R_1$, $X_1$ and $X_2$ are the same as defined above, and the aminoalkoxysilane-based modifier is the same as described above.

The hydrocarbon solvent is not specifically limited, but may be, for example, one or more selected from the group consisting of n-pentane, n-hexane, n-heptane, isooctane, cyclohexane, toluene, benzene and xylene.

The polymerization initiator is not specifically limited, but may be, for example, one or more selected from the group consisting of methyllithium, ethyllithium, propyllithium, isopropyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

According to an embodiment of the present invention, the polymerization initiator may be used in 0.01 mmol to 10 mmol, 0.05 mmol to 5 mmol, 0.1 mmol to 2 mmol, 0.1 mmol to 1 mmol, or 0.15 to 0.8 mmol based on total 100 g of the monomer. Here, the total 100 g of the monomer may mean the total amount of a modification monomer and a conjugated diene-based monomer, or the total amount of a modification monomer, a conjugated diene-based monomer and an aromatic vinyl-based monomer.

In addition, according to an embodiment of the present invention, the modification monomer may be used in 0.001 g to 10 g with respect to 100 g of the conjugated diene-based monomer, and particularly, in 0.01 g to 10 g or 0.1 g to 10 g with respect to 100 g of the conjugated diene-based monomer.

The polymerization of step (S1) may be, for example, an anionic polymerization, and particularly, a living anionic polymerization by which an anionic active part is formed at the polymerization terminal through a propagation reaction by anions. In addition, the polymerization of step (S1) may be a polymerization with heating, an isothermal polymerization, or a polymerization at a constant temperature (adiabatic polymerization). Here, the polymerization at a constant temperature means a polymerization method including a step of polymerizing using self-generated heat of reaction without optionally applying heat after adding a polymerization initiator, and the polymerization with heating means a polymerization method including injecting the polymerization initiator and then, increasing the temperature by optionally applying heat. The isothermal polymerization means a polymerization method by which the temperature of a polymerization reactant is kept constant by increasing heat by applying heat or taking heat after adding the polymerization initiator.

In addition, according to an embodiment of the present invention, the polymerization of step (S1) may be performed by further including a diene-based compound of 1 to carbon atoms in addition to the conjugated diene-based monomer, and in this case, effect of preventing the formation of gel on the wall of a reactor during operation for a long time may be achieved. The diene-based compound may include, for example, 1,2-butadiene.

The polymerization of step (S1) may be conducted in a temperature range of 80° C. or less, −20° C. to 80° C., 0° C. to 80° C., 0° C. to 70° C., or 10° C. to 70° C. Within the range, the molecular weight distribution of a polymer is controlled narrow, and the improving effect of physical properties is excellent.

The active polymer prepared by step (S1) may mean a polymer in which a polymer anion and an organometallic cation are coupled.

According to an embodiment of the present invention, the method for preparing a modified conjugated diene-based polymer may be performed in a plurality of reactors including two or more polymerization reactors and a modification reactor by a continuous type polymerization method. In a particular embodiment, step (S1) may be performed continuously in two or more polymerization reactors including a first reactor, and the number of the polymerization reactors may be flexibly determined according to reaction conditions and environment. The continuous type polymerization method may mean reaction processes of continuously supplying reactants to a reactor and continuously discharging reaction products thus produced. By the continuous type polymerization method, productivity and processability may be excellent, and effect of excellent uniformity of the polymer thus prepared may be achieved.

In addition, according to an embodiment of the present invention, if the active polymer is continuously prepared in the polymerization reactor, a polymerization conversion ratio in the first reactor may be 50% or less, from 10% to 50%, or from 20% to 50%, and within this range, side reactions generated while forming a polymer after initiating polymerization reaction may be restrained and a polymer with a linear structure may be induced during polymerization. Thus, the molecular weight distribution of the polymer may be controlled narrow, and effect of excellent improvement of physical properties may be achieved.

In this case, the polymerization conversion ratio may be controlled according to the reaction temperature, the residence time in the reactor, etc.

The polymerization conversion ratio may be determined, for example, by measuring the solid concentration in a polymer solution phase including the polymer during polymerizing a polymer. In a particular embodiment, in order to secure the polymer solution, a cylinder type container is installed at the outlet of each polymerization reactor to fill a certain amount of the polymer solution in the cylinder type container. Then, the cylinder type container is separated from the reactor, the weight (A) of the cylinder filled with the polymer solution is measured, the polymer solution filled in the cylinder type container is transported to an aluminum container, for example, an aluminum dish, the weight (B) of the cylinder type container from which the polymer solution is removed is measured, the aluminum container containing the polymer solution is dried in an oven of 140° C. for 30 minutes, the weight (C) of a dried polymer is measured, and calculation is performed according to the following Mathematical Equation 1:

ization in a reactor, after finishing step (S1) or step (S2) and prior to obtaining an active polymer or a modified conjugated diene-based polymer.

According to an embodiment of the present invention, the molecular weight distribution as indicated by a polydispersity index (PDI, Mw/Mn) of the active polymer prepared in step (S1) may be less than 1.5, from 1.0 to less than 1.5, or from 1.1 to less than 1.5, and within this range, the molecular weight distribution of a modified conjugated diene-based polymer which is prepared via a modification reaction or coupling with a modifier is narrow, and improving effect of physical properties may be excellent.

Meanwhile, the polymerization of step (S1) may be performed by including a polar additive, and the polar additive may be added in a ratio of 0.001 g to 50 g, 0.001 g to 10 g, or 0.005 g to 0.1 g based on total 100 g of the monomer. In another embodiment, the polar additive may be added in a ratio of 0.001 g to 10 g, 0.005 g to 5 g, or 0.005 g to 4 g based on total 1 mmol of the polymerization initiator.

The polar additive may be, for example, one or more selected from the group consisting of tetrahydrofuran, 2,2-di(2-tetrahydrofuryl)propane, diethyl ether, cycloamyl ether, dipropyl ether, ethylene methyl ether, ethylene dimethyl ether, diethyl glycol, dimethyl ether, tert-butoxy ethoxy ethane, bis(3-dimethylaminoethyl)ether, (dimethylaminoethyl) ethyl ether, trimethylamine, triethylamine, tripropylamine, N,N,N',N'-tetramethylethylenediamine, sodium mentholate, and 2-ethyl tetrahydrofufuryl ether, and may preferably be 2,2-di(2-tetrahydrofuryl)propane, triethylamine, tetramethylethylenediamine, sodium mentholate, or 2-ethyl tetrahydrofufuryl ether. If the polar additive is included, and if a conjugated diene-based monomer and an aromatic vinyl-based monomer are copolymerized, the difference of their reaction rates may be compensated, and effect of inducing easy formation of a random copolymer may be achieved.

[Mathematical Equation 1]

$$\text{Polymer conversion ratio (\%)} = \frac{\text{Weight}(C)}{[(\text{Weight}(A) - \text{Weight}(B)) \times \text{total solid content of each reactor(wt \%, } TSC)]}$$

Meanwhile, the polymerization reactant polymerized in the first reactor may be transported to polymerization reactors before a modification reactor in order, and polymerization may be performed until the final polymerization conversion ratio becomes 95% or more. After performing the polymerization in the first reactor, the polymerization conversion ratio of the second reactor, or each reactor from the second reactor to the polymerization reactor before the modification reactor may be appropriately controlled to control molecular weight distribution.

Meanwhile, in step (S1), during preparing an active polymer, the residence time of a polymerization reactant in the first reactor may be from 1 minute to 40 minutes, from 1 minute to 30 minutes, or from 5 minutes to 30 minutes, and within this range, the control of a polymerization conversion ratio is easy, and thus, the molecular weight distribution of a polymer is possibly controlled narrow, and effect of improving physical properties may be excellent.

The term "polymerization reactant" used in the present invention may mean an intermediate of a polymer type, which is under polymerization in each reactor during performing step (S1) or may mean a polymer with a polymerization conversion ratio of less than 95% under polymer- According to an embodiment of the present invention, the reaction or coupling of step (S2) may be performed in a modification reactor, and in this case, the modifier may be used in an amount of 0.01 mmol to 10 mmol based on total 100 g of the monomer. In another embodiment, the modifier may be used in a molar ratio of 1:0.1 to 10, 1:0.1 to 5, or 1:0.1 to 1:3, based on 1 mol of the polymerization initiator of step (S1).

In addition, according to an embodiment of the present invention, the modifier may be injected into a modification reactor, and step (S2) may be conducted in the modification reactor. In another embodiment, the modifier may be injected into a transporting part for transporting the active polymer prepared in step (S1) to a modification reactor for conducting step (S2), and the reaction or coupling may be performed by the mixing of the active polymer and the modifier in the transporting part.

The method for preparing a modified conjugated diene-based polymer according to an embodiment of the present invention is a method satisfying the properties of the above-described modified conjugated diene-based polymer. Effects intend to achieve in the present invention may be achieved if the above properties are satisfied as described above, but in at least in the preparation method, a polymerization conversion ratio during transporting from the first reactor to the second reactor is required to be satisfied and by controlling diversely other polymerization conditions, the physical properties of the modified conjugated diene-based polymer according to the present invention may be accomplished.

Also, the present invention provides a rubber composition including the modified conjugated diene-based polymer.

The rubber composition may include the modified conjugated diene-based polymer in an amount of 10 wt % or more, 10 wt % to 100 wt %, or 20 wt % to 90 wt %, and within this range, mechanical properties such as tensile strength and abrasion resistance are excellent, and effect of excellent balance between physical properties may be achieved.

In addition, the rubber composition may further include other rubber component, if needed, in addition to the modified conjugated diene-based polymer, and in this case, the rubber component may be included in an amount of 90 wt % or less based on the total weight of the rubber composition.

In a particular embodiment, the rubber component may be included in an amount of 1 part by weight to 900 parts by weight based on 100 parts by weight of the modified conjugated diene-based copolymer.

The rubber component may be, for example, a natural rubber or a synthetic rubber, and may particularly be a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, a butyl rubber, and a halogenated butyl rubber, and any one or a mixture two or more thereof may be used.

The rubber composition may include a filler of 0.1 parts by weight to 200 parts by weight, or 10 parts by weight to 120 parts by weight based on 100 parts by weight of the modified conjugated diene-based polymer of the present invention. The filler may be, for example, a silica-based filler, particularly, wet silica (hydrated silicate), dry silica (anhydrous silicate), calcium silicate, aluminum silicate, or colloid silica. Preferably, the filler may be wet silica which has the most significant improving effect of destruction characteristics and compatible effect of wet grip. In addition, the rubber composition may further include a carbon-based filler, if needed.

In another embodiment, if silica is used as the filler, a silane coupling agent may be used together for the improvement of reinforcing and low exothermic properties. Particular examples of the silane coupling agent may include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one or a mixture of two or more thereof may be used.

Preferably, bis(3-triethoxysilylpropyl)polysulfide or 3-trimethoxysilylpropylbenzothiazyltetrasulfide may be used in consideration of the improving effect of reinforcing properties.

In addition, in the rubber composition according to an embodiment of the present invention, since a modified conjugated diene-based polymer in which a functional group having high affinity with silica is brought in an active part is used as a rubber component, the mixing amount of the silane coupling agent may be smaller than a common case.

Thus, the silane coupling agent may be used in an amount of 1 part by weight to 20 parts by weight, or 5 parts by weight to 15 parts by weight based on 100 parts by weight of silica. Within the above amount range, effect as a coupling agent may be sufficiently exhibited, and preventing effect of gelation of a rubber component may be achieved.

The rubber composition according to an embodiment of the present invention may be sulfur crosslinkable, and so may further include a vulcanizing agent. The vulcanizing agent may particularly be a sulfur powder and may be included in an amount of 0.1 parts by weight to 10 parts by weight based on 100 parts by weight of a rubber component. Within the above amount range, elasticity and strength required for a vulcanized rubber composition may be secured, and at the same time, an excellent low fuel consumption ratio may be achieved.

The rubber composition according to an embodiment of the present invention may further include various additives used in a common rubber industry in addition to the above components, particularly, a vulcanization accelerator, a process oil, an antioxidant, a plasticizer, an antiaging agent, a scorch preventing agent, a zinc white, stearic acid, a thermosetting resin, or a thermoplastic resin.

The vulcanization accelerator may include, for example, thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG), in an amount of 0.1 parts by weight to 5 parts by weight based on 100 parts by weight of the rubber component.

The process oil acts as a softener in a rubber composition and may include, for example, a paraffin-based, naphthene-based, or aromatic compound. An aromatic process oil may be used in consideration of tensile strength and abrasion resistance, and a naphthene-based or paraffin-based process oil may be used in consideration of hysteresis loss and properties at a low temperature. The process oil may be included in an amount of 100 parts by weight or less based on 100 parts by weight of the rubber component. Within the above-described range, the deterioration of the tensile strength and low exothermic properties (low fuel consumption ratio) of the vulcanized rubber may be prevented.

The antioxidant may include, for example, 2,6-di-t-butyl paracresol, dibutylhydroxytoluenyl, 2,6-bis((dodecylthio)methyl)-4-nonylphenol or 2-methyl-4,6-bis((octylthio)

methyl)phenol, and may be used in an amount of 0.1 parts by weight to 6 parts by weight based on 100 parts by weight of a rubber component.

The antiaging agent may include, for example, N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature, in an amount of 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to a mixing prescription. A rubber composition having low exothermic properties and good abrasion properties may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

Also, the present invention provides a tire manufactured using the rubber composition.

The tire may be a tire or include a tire tread.

Hereinafter, the present invention will be explained in more detail referring to embodiments. Embodiments according to the present invention may be modified into various other types, and the scope of the present invention should not be limited to the embodiments described below. The embodiments of the present invention are provided for completely explaining the present invention to a person having an average knowledge in the art.

Preparation Example 1

1) Preparation of 4-Hydroxystyrene

To a 500 ml, round-bottom flask, 0.275 mol of sodium hydroxide was put and then dissolved by adding 60 ml of anhydrous ethanol, and 0.065 mol of acetoxystyrene was injected thereto, followed by stirring at room temperature in a nitrogen atmosphere for 4 hours. Then, 50 ml of distilled water was added, 30 ml of ethyl acetate was injected, and organic layers were extracted. The extraction of the organic layers was repeated three times. The organic layers thus extracted were dried by adding anhydrous magnesium sulfate and filtered to remove remaining water. Then, solvents were removed in a reduced pressure to obtain 7.54 g (yield 96%) of hydroxystyrene as a yellow solid. The $^1$H nuclear magnetic resonance spectroscopic data of purified 4-hydroxystyrene are as follows.

$^1$H-NMR (500 MHz, CDCl$_3$) δ 7.31-7.29 (d, J=9.5, 2H), δ 6.80-6.78 (d, J=8.5, Ar—H, 2H), δ 6.68-6.62 (q, J=9.5, 1H), δ 5.62-5.58 (d, J=17.5, 1H), δ 5.13-5.11 (d, J=11, 1H), δ 4.75 (s, 1H).

2) Preparation of 1-(2-Methoxyethoxy)-4-Vinylbenzene

To a 500 ml, round-bottom flask, 0.058 mmol of 4-hydroxystyrene was put and then dissolved by adding 50 ml of acetonitrile, and 0.071 mol of potassium t-butoxide was added thereto dropwisely, followed by refluxing for 1 hour. Then, 0.076 mol of 2-chloroethyl methyl ether was slowly added thereto dropwisely, and reacted by refluxing in a nitrogen atmosphere for 6 hours. After finishing the reaction, the reaction product was neutralized with an aqueous hydrochloric acid solution, and an organic layer was extracted with an ethyl acetate/saturated aqueous solution. The organic layer was dried with anhydrous magnesium sulfate and filtered to remove remaining water. Then, the solvents were removed in a reduced pressure to obtain 9.9 g (95%) of the target compound in a pale brown liquid phase. The $^1$H nuclear magnetic resonance spectroscopic data of purified 1-(2-methoxyethoxy)-4-vinylbenzene are as follows.

$^1$H-NMR (500 MHz, CDCl$_3$) δ 7.33-7.31 (d, J=9, Ar—H, 2H), δ 6.88-6.86 (d, J=8.5, Ar—H, 2H), δ 6.67-6.61 (q, J=9.5, 1H), δ 5.61-5.57 (d, J=17.5, 1H), δ 5.12-5.10 (d, J=11, 1H), δ 4.10-4.08 (t, J=4.5, 2H), δ 3.73-3.71 (t, J=4.75, 2H), δ 3.43 (s, 3H).

Preparation Example 2

1) Preparation of 3-Hydroxystyrene

To a 500 ml, round-bottom flask, 40.0 mmol of methyltriphenylphosphonium bromide (MePPh$_3$Br) and 100 ml of 2-methyltetrahydrofuran (THF) were added and stirred. After decreasing the temperature to 0° C., 40.0 mmol of n-butyllithium (1.6 M in hexane) was added dropwisely, and stirred for 4 hours. After that, 20 ml of a THF solution in which 20.0 mmol of 3-hydroxybenzaldehyde was dissolved was added dropwisely and stirred for 16 hours at room temperature (about 25° C.). 100 ml of methyl t-butyl ether (MTBE) was added to dilute the reaction solution, and the diluted reaction solution was passed through silica for filtering, and solvents were removed in vacuum and then separated by column chromatography (hexane:EA=4:1) to obtain 2.1 g (yield 87%) of 3-hydroxystyrene as a colorless liquid. The $^1$H nuclear magnetic resonance spectroscopic data of purified 3-hydroxystyrene are as follows.

$^1$H-NMR (500 MHz, CDCl$_3$) δ 7.19 (d, J=7.8, Ar—H, 1H), δ 6.98 (d, J=7.78, Ar—H, 1H), δ 6.89 (s, 1H), δ 6.74 (dd, J=9, 2, Ar—H, 1H), δ 6.64 (dd, J=18, 11, 1H), δ 5.70 (d, J=18, 1H), δ 5.23 (d, J=11, 1H), δ 5.05 (s, 1H).

2) Preparation of 1-(2-methoxyethoxy)-3-vinylbenzene

To a 500 ml, round-bottom flask, 0.058 mmol of 3-hydroxystyrene was put and then dissolved by adding 50 ml of acetonitrile, and 0.071 mol of potassium t-butoxide was added thereto dropwisely, followed by refluxing for 1 hour. Then, 0.076 mol of 2-chloroethyl methyl ether was slowly added thereto dropwisely, and reacted by refluxing in a nitrogen atmosphere for 6 hours. After finishing the reaction, the reaction product was neutralized with an aqueous hydrochloric acid solution, and an organic layer was extracted with an ethyl acetate/saturated aqueous solution. The organic layer was dried with anhydrous magnesium sulfate and filtered to remove remaining water. Then, the solvents were removed in a reduced pressure to obtain 9.5 g (91%) of the target compound in a pale brown liquid phase. The $^1$H nuclear magnetic resonance spectroscopic data of purified 1-(2-methoxyethoxy)-3-vinylbenzene are as follows.

$^1$H-NMR (500 MHz, CDCl$_3$) δ 7.27 (d, J=7.8, Ar—H, 1H), δ 7.06 (d, J=7.78, Ar—H, 1H), δ 6.97 (s, 1H), δ 6.81 (dd, J=8, 2, Ar—H, 1H), δ 6.62 (dd, J=18, 11, 1H), δ 5.71 (d, J=18, 1H), δ 5.24 (d, J=11, 1H), δ 4.15-4.13 (t, J=4.5, 2H), δ 3.77-3.75 (t, J=4.75, 2H), δ 3.45 (s, 3H).

Preparation Example 3

To a 500 ml, round-bottom flask, 10 mmol of (3-chloropropyl)dimethoxymethylsilane, 11 mmol of diethylamine and 100 ml of toluene were added and stirred at room temperature (about 25° C.) for complete dissolution, and the resultant solution was refluxed and stirred at 110° C. for 2 hours to prepare 3-(dimethoxy(methyl)silyl)-N,N-diethylpropan-1-amine (yield 98%).

Preparation Example 4

To a 500 ml, round-bottom flask, 10 mmol of 3,3'-(1,1,3,3-tetramethoxydisiloxane-1,3-diyl)bis(propan-1-amine) and 100 ml of toluene were put and stirred at room temperature (about 25° C.) for complete dissolution, and 11 mmol of triethylamine and 10.5 mmol of trimethylsilyl chloride were added and reacted at 40° C. for 2 hours to prepare N,N-(1,1,3,3-tetramethoxydisiloxane-1,3-diyl)bis(propan-3,1-diyl))bis(1,1,1-trimethyl-N-(trimethylsilyl)silanamine) (yield 98%).

Preparation Example 5

To a 500 ml, round-bottom flask, 0.2 mol of diallyl methylamine and 0.26 g of a toluene solution of a Pt-1,3-divinyl-1,1,3,3-tetramethyl disiloxane complex (Pt amount of 3 wt %) were injected and heated to 70° C. After the internal temperature was stabilized, 0.4 mol of methyldiethoxysilane was injected dropwisely over 4 hours, followed by reacting at the temperature for 1 hour to prepare N,N-bis(3-(diethoxy(methyl)silyl)propyl)-1,1,1-trimethylsilanamine (yield 66%).

Example 1

To a first reactor among continuous reactors of three reactors connected in series, injected were a styrene solution in which 60 wt % of styrene was dissolved in n-hexane in a rate of 1.92 kg/h, a 1,3-butadiene solution in which 60 wt % of 1,3-butadiene was dissolved in n-hexane in a rate of 11.8 kg/h, a modification monomer solution in which 15 wt % of 1-(2-methoxyethoxy)-4-vinylbenzne prepared in Preparation Example 1 was dissolved in n-hexane in a rate of 89.0 g/h, n-hexane in a rate of 47.73 kg/h, a 1,2-butadiene solution in which 2.0 wt % of 1,2-butadiene was dissolved in n-hexane in a rate of 40 g/h, a solution in which 10 wt % of 2,2-di(2-tetrahydrofuryl)propane was dissolved in n-hexane as a polar additive in a rate of 53.0 g/h, and an n-butyllithium solution in which 10 wt % of n-butyllithium was dissolved in n-hexane in a rate of 48.0 g/h. In this case, the temperature of the first reactor was maintained to 50° C., and when a polymerization conversion ratio reached 43%, a polymerization reactant was transported from the first reactor to a second reactor via a transport pipe.

Then, to the second reactor, a 1,3-butadiene solution in which 60 wt % of 1,3-butadiene was dissolved in n-hexane was injected in a rate of 2.95 kg/h. In this case, the temperature of the second reactor was maintained to 65° C., and when a polymerization conversion ratio reached 95% or more, a polymerization reactant was transported from the second reactor to a third reactor via a transport pipe.

The polymerization reactant was transported from the second reactor to the third reactor, and a solution in which wt % of 3-(dimethoxy(methyl)silyl)-N,N-diethylpropan-1-amine prepared in Preparation Example 3 was dissolved as a modifier, was injected to a third reactor in a rate of 64.0 g/h. The temperature of the third reactor was maintained to 65° C.

After that, to a polymerization solution discharged from the third reactor, an IR1520 (BASF Co.) solution in which 30 wt % of an antioxidant was dissolved, was injected in a rate of 167 g/h and stirred. The polymerization reactant thus obtained was injected in hot water heated with steam and stirred to remove solvents to prepare a modified conjugated diene-based polymer.

Example 2

A modified conjugated diene-based polymer was prepared by performing the same method as in Example 1 except for continuously supplying a solution in which 20 wt % of N,N'-(1,1,3,3-tetramethoxydisiloxane-1,3-diyl)bis(propan-3,1-diyl))bis(1,1,1-trimethyl-N-(trimethylsilyl)silanamine prepared in Preparation Example 4 was dissolved instead of 3-(dimethoxy(methyl)silyl)-N,N-diethylpropan-1-amine as a modifier, to a third reactor in a rate of 116.0 g/h.

Example 3

A modified conjugated diene-based polymer was prepared by performing the same method as in Example 1 except for continuously supplying a solution in which 20 wt % of N,N-bis(3-(diethoxy(methyl)silyl)propyl)-1,1,1-trimethylsilanamine prepared in Preparation Example 5 was dissolved instead of 3-(dimethoxy(methyl)silyl)-N,N-diethylpropan-1-amine as a modifier, to a third reactor in a rate of 103.5 g/h.

Example 4

A modified conjugated diene-based polymer was prepared by performing the same method as in Example 1 except for continuously supplying a solution in which 15 wt % of 1-(2-methoxyethoxy)-3-vinylbenzene prepared in Preparation Example 2 was dissolved instead of 1-(2-methoxyethoxy)-4-vinylbenzene as a modification monomer, to a first reactor in a rate of 89.0 g/h.

Comparative Example 1

To a 20 L autoclave reactor, 100 g of styrene, 880 g of 1,3-butadiene, 6.2 g of 1-(2-methoxyethoxy)-4-vinylbenzene, 5000 g of n-hexane and 0.89 g of 2,2-di(2-tetrahydrofuryl)propane as a polar additive were injected, and the internal temperature of the reactor was elevated to 50° C. When the internal temperature of the reactor reached 50° C., 5.5 mmol of n-butyllithium was injected and an adiabatic reaction with heating was performed. After about minutes lapse, 20 g of 1,3-butadiene was injected for capping the terminals of a polymer chain with butadiene. After 5 minutes, 5.5 mmol of 3-(dimethoxy(methyl)silyl)-N,N-diethylpropan-1-amine was injected as a modifier and reacted for 15 minutes. Then, the polymerization reaction was quenched using ethanol, and 45 ml of a solution in which 0.3 wt % of IR1520 (BASF Co.) antioxidant was dissolved in n-hexane was added thereto. The polymerization reactant thus obtained was injected into hot water heated using steam and stirred to remove solvents to prepare a modified conjugated diene-based polymer.

Comparative Example 2

To a first reactor among continuous reactors of two reactors connected in series, injected were a styrene solution in which 60 wt % of styrene was dissolved in n-hexane in a rate of 1.92 kg/h, a 1,3-butadiene solution in which 60 wt % of 1,3-butadiene was dissolved in n-hexane in a rate of 11.8 kg/h, n-hexane in a rate of 47.73 kg/h, a 1,2-butadiene solution in which 2.0 wt % of 1,2-butadiene was dissolved in n-hexane in a rate of 40 g/h, a solution in which 10 wt % of 2,2-di(2-tetrahydrofuryl)propane was dissolved in n-hexane as a polar additive in a rate of 53.0 g/h, and an n-butyllithium solution in which 10 wt % of n-butyllithium was dissolved in n-hexane in a rate of 48.0 g/h. In this case, the temperature of the first reactor was maintained to 55° C., and when a polymerization conversion ratio reached 48%, a polymerization reactant was transported from the first reactor to a second reactor via a transport pipe.

Then, to the second reactor, a 1,3-butadiene solution in which 60 wt % of 1,3-butadiene was dissolved in n-hexane was injected in a rate of 2.95 kg/h. In this case, the temperature of the second reactor was maintained to 65° C., and when a polymerization conversion ratio reached 95% or more, the reaction was terminated.

After that, to a polymerization solution discharged from the second reactor, an IR1520 (BASF Co.) solution in which 30 wt % of an antioxidant was dissolved was injected in a rate of 100 g/h and stirred. The polymerization reactant thus obtained was injected in hot water heated with steam and stirred to remove solvents to prepare an unmodified conjugated diene-based polymer.

Comparative Example 3

To a first reactor among continuous reactors of three reactors connected in series, injected were a styrene solution in which 60 wt % of styrene was dissolved in n-hexane in a rate of 1.92 kg/h, a 1,3-butadiene solution in which 60 wt % of 1,3-butadiene was dissolved in n-hexane in a rate of 11.8 kg/h, n-hexane in a rate of 47.73 kg/h, a 1,2-butadiene solution in which 2.0 wt % of 1,2-butadiene was dissolved in n-hexane in a rate of 40 g/h, a solution in which 10 wt % of 2,2-di-(2-tetrahydrofuryl)propane was dissolved in n-hexane as a polar additive in a rate of 53.0 g/h, and an n-butyllithium solution in which 10 wt % of n-butyllithium was dissolved in n-hexane in a rate of 48.0 g/h. In this case, the temperature of the first reactor was maintained to 50° C., and when a polymerization conversion ratio reached 43%, a polymerization reactant was transported from the first reactor to a second reactor via a transport pipe.

Then, to the second reactor, a 1,3-butadiene solution in which 60 wt % of 1,3-butadiene was dissolved in n-hexane was injected in a rate of 2.95 kg/h. In this case, the temperature of the second reactor was maintained to 65° C., and when a polymerization conversion ratio reached 95%, a polymer was transported from the second reactor to a third reactor via a transport pipe.

The polymerization reactant was transported from the second reactor to the third reactor, and a solution in which wt % of 3-(dimethoxy(methyl)silyl)-N,N-diethylpropan-1-amine was dissolved as a modifier, was injected to the third reactor in a rate of 64.0 g/h. The temperature of the third reactor was maintained to 65° C.

After that, to a polymerization solution discharged from the third reactor, an IR1520 (BASF Co.) solution in which 30 wt % of an antioxidant was dissolved, was injected in a rate of 167 g/h and stirred. The polymerization reactant thus obtained was injected in hot water heated with steam and stirred to remove solvents to prepare a modified conjugated diene-based polymer.

Comparative Example 4

A modified conjugated diene-based polymer was prepared by performing the same method as in Example 1 except for transporting a polymerization reactant from the first reactor to the second reactor via a transport pipe when a polymerization conversion ratio reached 43%, and injecting a solution in which 2 wt % of dichlorodimethylsilane was dissolved in n-hexane instead of 3-(dimethoxy(methyl)silyl)-N,N-diethylpropan-1-amine, to the third reactor in a rate of 36 g/h.

Comparative Example 5

A modified conjugated diene-based polymer was prepared by performing the same method as in Example 3 except for maintaining the reaction temperature to 75° C. in the first reactor, 80° C. in the second reactor, and 80° C. in the third reactor, transporting a polymerization reactant from the first reactor to the second reactor via a transport pipe when a polymerization conversion ratio in the first reactor reached 70%.

Reference Example 1

A modified conjugated diene-based polymer was prepared by performing the same method as in Comparative Example 1 except for injecting 16.5 mmol of 3-(dimethoxy(methyl)silyl)-N,N-diethylpropan-1-amine.

Reference Example 2

A modified conjugated diene-based polymer was prepared by performing the same method as in Comparative Example 1 except for injecting 2.5 mmol of 3-(dimethoxy(methyl)silyl)-N,N-diethylpropan-1-amine.

Experimental Example 1

With respect to each of the modified or unmodified conjugated diene-based polymers prepared in the Examples, Comparative Examples, and Reference Examples, styrene unit and vinyl contents in each polymer, a weight average molecular weight (Mw, $\times 10^3$ g/mol), a number average molecular weight (Mn, $\times 10^3$ g/mol), molecular weight distribution (PDI, MWD), a coupling number, mooney viscosity, a mooney relaxation ratio, a shrinking factor, the Si content and the N content were measured, respectively. The results are shown in Table 1 below.

1) Styrene Unit and Vinyl Contents (Wt %)

The styrene unit (SM) and vinyl contents in each polymer were measured and analyzed using Varian VNMRS 500 MHz NMR.

When measuring NMR, 1,1,2,2-tetrachloroethane was used as a solvent, and styrene unit and vinyl contents were calculated by calculating a solvent peak as 5.97 ppm, and regarding 7.2-6.9 ppm as random styrene peaks, 6.9-6.2 ppm as block styrene peaks, 5.8-5.1 ppm as 1,4-vinyl peaks, and 5.1-4.5 ppm as 1,2-vinyl peaks.

2) Weight Average Molecular Weight (Mw, $\times 10^3$ g/Mol), Number Average Molecular Weight (Mn, $\times 10^3$ g/Mol), Molecular Weight Distribution (PDI, MWD) and Coupling Number (C.N)

By gel permeation chromatography (GPC) analysis, a weight average molecular weight (Mw) and a number average molecular weight (Mn) were measured and a molecular weight distribution curve was obtained. In addition, molecular weight distribution (PDI, MWD, Mw/Mn) was calculated from each molecular weight thus measured. Particularly, GPC was conducted using two columns of PLgel Olexis (Polymer Laboratories Co.) and one column of PLgel mixed-C (Polymer Laboratories Co.) in combination, and polystyrene (PS) as a GPC standard material for calculating the molecular weights. A solvent for measuring GPC was prepared by mixing tetrahydrofuran with 2 wt % of an amine compound. In this case, the molecular weight distribution curves thus obtained are shown in FIG. 1 to FIG. 4.

In addition, a coupling number was obtained by collecting a partial polymerization reactant prior to injecting a modifier or a coupling agent in each of the Examples, Comparative Examples and Reference Examples, obtaining a peak molecular weight ($Mp_1$) of a polymer, obtaining a peak molecular weight ($Mp_2$) of each modified conjugated diene-based polymer, and calculating by the following Mathematical Equation 3:

Coupling number (C.N)=$Mp_2/Mp_1$    [Mathematical Equation 3]

3) Mooney Viscosity and Mooney Relaxation Ratio

The mooney viscosity (MV, (ML1+4, @100° C.) MU) was measured by using MV-2000 (Alpha Technologies Co.) using Large Rotor at a rotor speed of 2±0.02 rpm at 100° C. In this case, a specimen used was stood at room temperature (23±3° C.) for 30 minutes or more, and 27±3 g of the specimen was collected and put in a die cavity, and then, Platen was operated for 4 minutes for measurement.

After measuring the mooney viscosity, the slope value of the change of the mooney viscosity shown while releasing torque was measured, and the mooney relaxation ratio was obtained as the absolute value thereof.

4) Si Content

The Si content was measured by an ICP analysis method, which used an inductively coupled plasma optical emission spectroscopy (ICP-OES; Optima 7300DV). Particularly, measurement was performed by adding about 0.7 g of a specimen to a platinum (Pt) crucible and adding about 1 mL of concentrated sulfuric acid (98 wt %, electronic grade) thereto, heating at 300° C. for 3 hours, incinerating the specimen in an electrical furnace (Thermo Scientific, Lindberg Blue M) by the following program of steps 1 to 3:

1) step 1: initial temp 0° C., rate (temp/hr) 180° C./hr, temp (holdtime) 180° C. (1 hr)

2) step 2: initial temp 180° C., rate (temp/hr) 85° C./hr, temp (holdtime) 370° C. (2 hr)

3) step 3: initial temp 370° C., rate (temp/hr) 47° C./hr, temp (holdtime) 510° C. (3 hr), adding 1 mL of concentrated nitric acid (48 wt %) and 20 μl of concentrated hydrofluoric acid (50 wt %) to a residue, sealing the platinum crucible and shaking for 30 minutes or more, adding 1 mL of boric acid to the specimen, storing at 0° C. for 2 hours or more, diluting in 30 mL of ultrapure water, and performing incineration.

5) N Content

The N content was measured through an NSX analysis method using a quantitative analyzer of a trace amount of nitrogen (NSX-2100H). Particularly, the quantitative analyzer of a trace amount of nitrogen (Auto sampler, Horizontal furnace, PMT & Nitrogen detector) was turned on, carrier gas flow amounts were set to 250 ml/min for Ar, 350 ml/min for $O_2$, and 300 ml/min for ozonizer, a heater was set to 800° C., and the analyzer was stood for about 3 hours for stabilization. After stabilizing the analyzer, a calibration curve of calibration curve ranges of 5 ppm, 10 ppm, 50 ppm, 100 ppm and 500 ppm was made using Nitrogen standard (AccuStandard S-22750-01-5 ml), and an area corresponding to each concentration was obtained. Then, by using the ratios of concentrations to areas, a straight line was made. After that, a ceramic boat holding 20 mg of a specimen was put in the auto sampler of the analyzer and measurement was conducted to obtain an area. By using the area of the specimen thus obtained and the calibration curve, the N content was calculated.

6) Shrinking Factor (g')

The shrinking factor was shown by obtaining absolute molecular weights from a light scattering detector by injecting a specimen into a GPC-light scattering measurement apparatus (Viscotek TDAmax, Malvern Co.) equipped with a light scattering detector and a viscosity detector, obtaining intrinsic viscosity [η] on the absolute molecular weight from the light scattering detector and the viscosity detector, computing the intrinsic viscosity $[\eta]_0$ on the absolute molecular weight corresponding to each absolute molecular weight through Mathematical Equation 2 below, and showing an average value of the ratio of intrinsic viscosity ($[\eta]/[\eta]_0$) corresponding to each absolute molecular weight as the shrinking factor. In this case, a mixture solution of tetrahydrofuran and N,N,N',N'-tetramethylethylenediamine (controlled by mixing 20 mL of N,N,N',N'-tetramethylethylenediamine with 1 L of tetrahydrofuran) was used as an eluent, PL Olexix (Agilent Co.) was used as a column, measurement was conducted under conditions of an oven temperature of 40° C. and a THF flow rate of 1.0 mL/min, and a specimen was prepared by dissolving 15 mg of a polymer in 10 mL of THF.

$[\eta]_0 = 10^{-3.883} M^{0.771}$    [Mathematical Equation 2]

In Mathematical Equation 2, M is an absolute molecular weight.

TABLE 1

| | | Example | | | | Reference Example | | Comparative Example | | | | |
|---|---|---|---|---|---|---|---|---|---|---|---|---|
| | Division | 1 | 2 | 3 | 4 | 1 | 2 | 1 | 2 | 3 | 4 | 5 |
| Reaction conditions | Modification Monomer | M1 | M1 | M1 | M2 | M1 | M1 | M1 | — | — | M1 | M1 |
| | Modifier or coupling agent | F1 | F2 | F3 | F1 | F1 | F1 | F1 | — | F1 | C1 | F3 |
| | First reactor temperature | 50 | 50 | 50 | 50 | 50->80 | 50->80 | 50->80 | 55 | 50 | 50 | 75 |

TABLE 1-continued

|  | Division | Example 1 | Example 2 | Example 3 | Example 4 | Reference Example 1 | Reference Example 2 | Comparative Example 1 | Comparative Example 2 | Comparative Example 3 | Comparative Example 4 | Comparative Example 5 |
|---|---|---|---|---|---|---|---|---|---|---|---|---|
|  | (° C.) First reactor polymerization conversion ratio (%) | 43 | 43 | 43 | 43 | — | — | — | 48 | 43 | 43 | 70 |
| NMR (wt %) | SM | 10 | 10 | 10 | 10 | 10 | 10 | 10 | 10 | 10 | 10 | 10 |
|  | Vinyl | 38 | 38 | 38 | 38 | 38 | 38 | 38 | 38 | 38 | 38 | 38 |
| GPC | Mw(×10³ g/mol) | 435 | 480 | 512 | 420 | 392 | 448 | 531 | 448 | 512 | 483 | 640 |
|  | Mn(×10³ g/mol) | 290 | 320 | 320 | 280 | 260 | 318 | 322 | 320 | 320 | 322 | 320 |
|  | PDI | 1.50 | 1.50 | 1.60 | 1.50 | 1.51 | 1.41 | 1.65 | 1.40 | 1.60 | 1.50 | 2.00 |
|  | C.N. | 1.2 | 1.8 | 1.7 | 1.2 | 1.0 | 2.0 | 1.9 | — | 1.8 | 1.3 | 1.5 |
| Molecular weight distribution curve |  | Unimodal | Unimodal | Unimodal | Unimodal | Unimodal | Unimodal | Bimodal | Unimodal | Unimodal | Unimodal | Unimodal |
| Mooney viscosity (MV) |  | 55 | 58 | 60 | 53 | 52 | 56 | 61 | 55 | 59 | 58 | 68 |
| Money relaxation ratio |  | 1.130 | 1.030 | 1.080 | 1.10 | 1.276 | 0.843 | 0.800 | 0.844 | 1.080 | 1.146 | 0.517 |
| Contraction factor (g') |  | 1.210 | 1.110 | 1.160 | 1.150 | 1.417 | 0.908 | 0.857 | 0.918 | 1.160 | 1.264 | 0.488 |
| Si content (ppm) |  | 115 | 220 | 220 | 115 | 110 | 70 | 105 | — | 215 | 20 | 85 |
| N content (ppm) |  | 65 | 110 | 68 | 65 | 50 | 15 | 60 | — | 68 | — | 50 |

In Table 1, particular materials of the initiator, modifier and coupling agent are as follows.
* Modification monomer M1: 1-(2-methoxyethoxy)-4-vinylbenzene
* Modification monomer M2: 1-(2-methoxyethoxy)-3-vinylbenzene
* Modifier F1: 3-(dimethoxy(methyl)silyl)-N,N-diethylpropan-1-amine
* Modifier F2: (N,N'-(1,1,3,3-tetramethoxydisiloxane-1,3-diyl)bis(propan-3,1-diyl)bis(1,1,1-trimethyl-N-(trimethylsilyl)silanamine)
* Modifier F3: N,N-bis(3-(diethoxy(methyl)silyl)propyl)-1,1,1-trimethylsilanamine
* Coupling agent C1: dichlorodimethylsilane As shown in Table 1, it could be confirmed that the modified conjugated diene-based polymers of Examples 1 to 4 according to embodiments of the present invention had a unimodal shape molecular weight distribution curve by gel permeation chromatography (see FIG. 1), PDI (molecular weight distribution) of 1.0 to less than 1.7, the Si content and N content of 50 ppm or more, a mooney relaxation ratio of 0.7 or more, and a shrinking factor of 0.8 or more. In contrast, it could be confirmed that the modified or unmodified conjugated diene-based polymers of Comparative Example 1 to Comparative Example 5 had a bimodal shape molecular weight distribution curve by gel permeation chromatography (see FIG. 2), a mooney relaxation ratio of less than 0.7, a shrinking factor of less than 0.8, the Si content of less than 50 ppm and the N content of less than 50 ppm, particularly, it could be confirmed that Comparative Example 5 which was prepared by continuous polymerization but the polymerization conversion ratio in the first reactor deviated from the range of the present invention had a PDI value of greater than 1.7, and a mooney relaxation ratio and shrinking factor of 0.517 and 0.488, respectively, which were short of the numerical ranges suggested in the present invention and markedly decreased when compared with those of the Examples.

Figure 2:
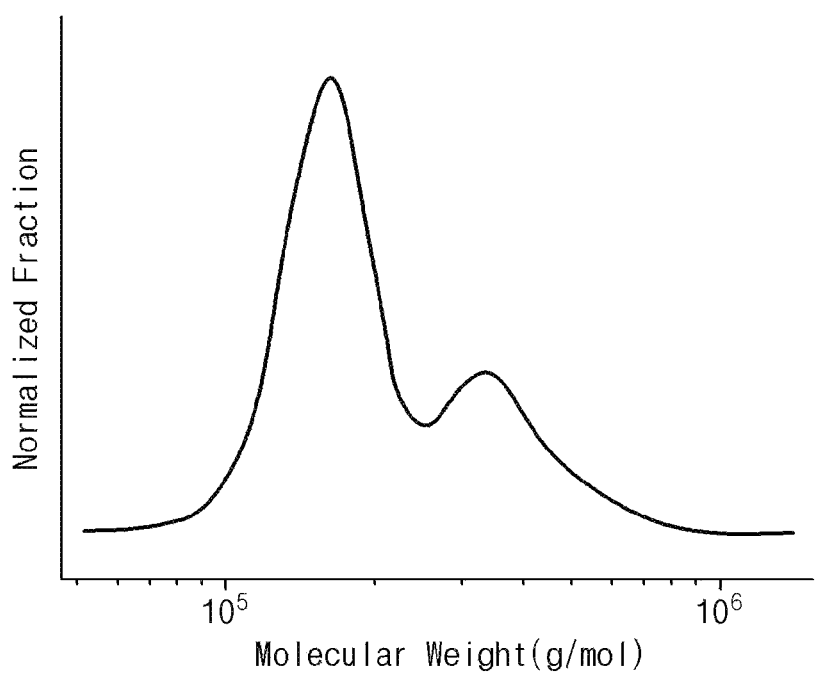
FIG. 2 illustrates a molecular weight distribution curve by gel permeation chromatography (GPC) of a modified conjugated diene-based polymer of Comparative Example 1 according to an embodiment of the present invention.
Figure 3:
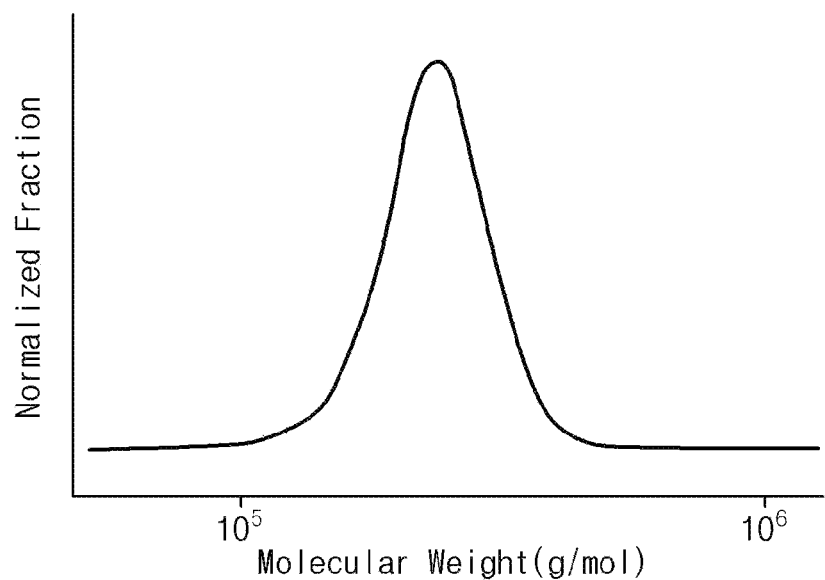
FIG. 3 illustrates a molecular weight distribution curve by gel permeation chromatography (GPC) of a modified conjugated diene-based polymer of Reference Example 1 according to an embodiment of the present invention.
Figure 4:
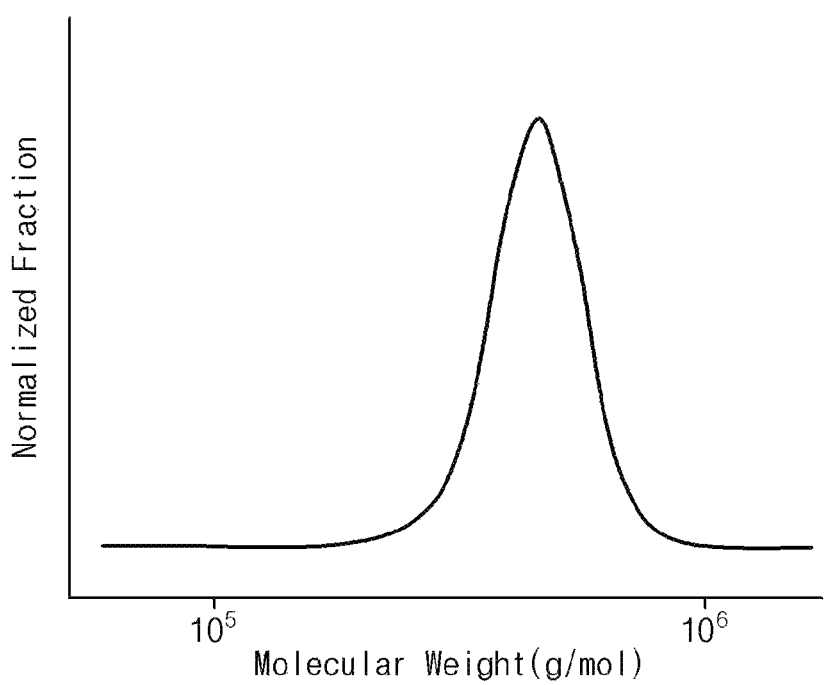
FIG. 4 illustrates a molecular weight distribution curve by gel permeation chromatography (GPC) of a modified conjugated diene-based polymer of Reference Example 2 according to an embodiment of the present invention.

In addition, in case of Comparative Example 1 in which a polymer was prepared by the batch type polymerization method of the present invention showed a bimodal shape molecular weight distribution curve by gel permeation chromatography (see FIG. 2). Meanwhile, as in Reference Example 1 and Reference Example 2, the molecular weight distribution curves may be controlled to have a unimodal shape even though the batch type polymerization method was applied (see FIGS. 3 and 4), but in this case, the coupling number of the polymers were 1.0 and 2.0, respectively, and a case where the entire polymer was uncoupled by the modifier (Reference Example 1) and a case where most of the polymer was coupled by the modifier (Reference Example 2) may be present, and thus, the structure and properties are different from the unimodal polymer according to the continuous polymerization method of the present invention, and which may be confirmed in Table 3 described later as markedly decreased processability, tensile properties and viscoelasticity properties when compared with those of the Examples.

Meanwhile, the modified conjugated diene-based polymers of Comparative Examples 3 and 4 were prepared by equivalent degrees as the Examples according to the present invention except for the application of the modification monomer or not and the kind of the modifier during polymerization, and the physical properties of the polymer such as molecular weight distribution, coupling number, mooney relaxation ratio and shrinking factor showed similar degrees. However, since the functional group derived from the modification monomer or the functional group derived from the modifier, suggested in the present invention is not included, affinity with a filler is inferior, which may be confirmed through the remarkable decrease of the tensile properties and viscoelasticity properties of Comparative Examples 3 and 4 when compared with the Examples in Table 3 described later.

Experimental Example 2

In order to comparatively analyze the physical properties of rubber compositions including each of the modified or unmodified copolymers prepared in the Examples, Comparative Examples and Reference Examples, and molded articles manufactured therefrom, tensile properties and viscoelasticity properties were measured, respectively, and the results are shown in Table 3 below.

1) Preparation of Rubber Specimen

Blending was performed using each of the modified or unmodified conjugated diene-based polymers of the Examples, Comparative Examples and Reference Examples as a raw material rubber under the blending conditions shown in Table 2. The raw materials in Table 2 are represented by parts by weight based on 100 parts by weight of the raw material rubber.

TABLE 2

| Division | Raw material | Amount (parts by weight) |
|---|---|---|
| First stage mulling | Rubber | 100 |
| | Silica | 70 |
| | Coupling agent (X50S) | 11.2 |
| | Process oil | 37.5 |
| | Zinc white | 3 |
| | Stearic acid | 2 |
| | Antioxidant | 2 |
| | Antiaging agent | 2 |
| | wax | 1 |
| Second stage mulling | Sulfur | 1.5 |
| | Rubber accelerator | 1.75 |
| | Vulcanization accelerator | 2 |

Particularly, the rubber specimen was mulled via a first stage mulling and a second stage mulling. In the first stage mulling, a raw material rubber, silica (filler), an organic silane coupling agent (X50S, Evonik), a process oil (TADE oil), zinc oxide (ZnO), stearic acid, an antioxidant (TMQ (RD)) (2,2,4-trimethyl-1,2-dihydroquinoline polymer), an antiaging agent (6PPD ((dimethylbutyl)-N-phenyl-phenylenediamine) and wax (Microcrystaline Wax) were mulled using a banbury mixer equipped with a temperature controlling apparatus. In this case, the initial temperature of a mulling apparatus was controlled to 70° C., and after finishing mixing, a first compound mixture was obtained at a discharge temperature of 145° C. to 155° C. In the second stage mulling, the first compound mixture was cooled to room temperature, and the first compound mixture, sulfur, a rubber accelerator (DPD (diphenylguanine)), and a vulcanization accelerator (CZ (N-cyclohexyl-2-benzothiazylsulfenamide)) were added to the mulling apparatus and mixed at a temperature of 100° C. or less to obtain a second compound mixture. Then, via a curing process at 160° C. for 20 minutes, a rubber specimen was formed.

2) Tensile Properties

The tensile properties were measured by manufacturing each specimen and measuring tensile strength when broken and tensile stress when stretched by 300% (300% modulus) of each specimen according to an ASTM 412 tensile test method. Particularly, tensile properties were measured using a Universal Test Machin 4204 tensile tester (Instron Co.) in a rate of 50 cm/min at room temperature.

3) Viscoelasticity Properties

The viscoelasticity properties were secured by measuring viscoelasticity behavior on thermodynamic deformation at each measurement temperature (−60° C.-60° C.) with a frequency of 10 Hz by using a dynamic mechanical analyzer (GABO Co.) in a film tension mode and securing a tan δ value. From the resultant values, if the index value of tan δ at a low temperature of 0° C. increases, wet skid resistance becomes better, and if the index value of tan δ at a high temperature of 60° C. decreases, hysteresis loss decreases, and low running resistance (fuel consumption ratio) becomes better. The resultant values in Table 3 were indexed by setting the resultant value of Comparative Example 2 to 100, and thus, the higher numerical value means better results.

4) Processability Properties

By measuring the mooney viscosity (MV, (ML 1+4, @100° C.) MU) of the secondary mixture compound obtained during 1) preparation of rubber specimen, the processability properties of each polymer was comparatively analyzed, and in this case, the lower the measured value of the moony viscosity is, the better the processability properties are.

Particularly, by using MV-2000 (Alpha Technologies Co.) using Large Rotor at a rotor speed of 2±0.02 rpm at 100° C., each secondary mixture compound was stood at room temperature (23±3° C.) for 30 minutes or more, and 27±3 g was collected and put in a die cavity, and then, Platen was operated for 4 minutes for measurement.

TABLE 3

| Division | | Example 1 | Example 2 | Example 3 | Example 4 | Reference Example 1 | Reference Example 2 | Comparative Example 1 | Comparative Example 2 | Comparative Example 3 | Comparative Example 4 | Comparative Example 5 |
|---|---|---|---|---|---|---|---|---|---|---|---|---|
| Tensile properties | Tensile strength (kgf/cm$^2$) | 161 | 165 | 162 | 160 | 158 | 155 | 162 | 160 | 161 | 161 | 160 |
| | 300% modulus (kgf/cm$^2$) | 110 | 113 | 110 | 110 | 86 | 87 | 108 | 83 | 100 | 93 | 99 |
| Viscoelasticity properties | tan δ (at 0° C.) | 102 | 105 | 100 | 102 | 99 | 100 | 99 | 100 | 100 | 101 | 98 |
| | tan δ (at 60° C.) | 127 | 133 | 128 | 125 | 108 | 107 | 119 | 100 | 121 | 107 | 115 |
| Processability properties | | 79 | 83 | 81 | 78 | 96 | 90 | 88 | 69 | 80 | 81 | 92 |

In Table 3, the resultant values of viscoelasticity properties of Example 1 to Example 4, Comparative Example 1, Comparative Examples 3 to 5, Reference Examples 1 and 2 were indexed (%) based on the measured value of Comparative Example 2 and shown.

As shown in Table 3, Example 1 to Example 4 according to embodiments of the present invention showed improved tensile properties, viscoelasticity properties and processability properties when compared with Comparative Example 1 to Comparative Example 5.

Particularly, Examples 1 to 4 showed decreased processability when compared with Comparative Example 2 which was an unmodified conjugated diene-based polymer, but showed markedly excellent tensile properties with 30% or more 300% modulus, and improved tan δ value at 0° C. while markedly improved tan δ value at 60° C. by 25% or more.

In addition, when compared with Comparative Examples to 5, Examples 1 to 4 showed equivalent or better processability, tensile properties and tan δ value at 0° C. while markedly improved effects of tan δ value at 60° C. by about 10% or more.

Meanwhile, with respect to the viscoelasticity properties, it is known very difficult that a tan δ value at 0° C. increases while a tan δ value at 60° C. increases at the same time. Accordingly, when compared with the Comparative Examples, Example 1 to Example 4 showing equal or better degree of a tan δ value at 0° C. and remarkably improved effects of a tan δ value at 60° C., had very excellent viscoelasticity properties.

In addition, as shown in Table 3, in case of having a unimodal shape molecular weight distribution curve even though prepared through batch polymerization as in Reference Examples 1 and 2, the intrinsic inferior processability of batch polymerization was not improved and also, compounding properties such as tensile properties and viscoelasticity properties accomplished by common batch polymerization were markedly inferior when compared with the Examples. Here, the intrinsic inferior processability of batch polymerization may be confirmed through the results of Comparative Example 1 which was prepared by common batch polymerization and had a bimodal shape molecular weight distribution curve.

The invention claimed is:

1. A modified conjugated diene-based polymer, comprising:
   a functional group derived from a modification monomer represented by the following Formula 1, and
   a functional group derived from an aminoalkoxysilane-based modifier in at least one terminal:

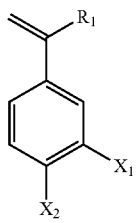

[Formula 1]

in Formula 1,
$X_1$ and $X_2$ are each independently hydrogen or —O[CH$_2$CH$_2$O]$_a$CH$_3$, where one among $X_1$ and $X_2$ is —O[CH$_2$CH$_2$O]$_a$CH$_3$ and the other one is hydrogen,
$R_1$ is hydrogen or a monovalent hydrocarbon group of 1 to 20 carbon atoms, and
a is an integer of 1 to 11,
wherein the polymer has unimodal molecular weight distribution, and a polydispersity index (PDI) of 1.0 to less than 1.7, and
wherein a coupling number (C.N.) of the modified conjugated diene-based polymer satisfies 1<C.N.<F, where F is the number of functional groups of the modifier, and
wherein the modified conjugated diene-based polymer has a Si content of 50 ppm or more, and a N content of 50 ppm or more, respectively, based on the total weight of the modified conjugated diene-based polymer.

2. The modified conjugated diene-based polymer of claim 1, wherein in Formula 1, $R_1$ is hydrogen, an alkyl group of 1 to 20 carbon atoms, a cycloalkyl group of 3 to 20 carbon atoms, an aryl group of 6 to 20 carbon atoms, an arylalkyl group of 7 to 20 carbon atoms, an alkoxy group of 1 to 20 carbon atoms, an alkoxyalkyl group of 2 to 20 carbon atoms or a phenoxyalkyl group of 7 to 20 carbon atoms.

3. The modified conjugated diene-based polymer of claim 1, wherein the aminoalkoxysilane-based modifier is selected from compounds represented by the following Formula 2 or Formula 3:

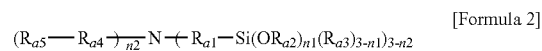

[Formula 2]

$R_{a1}$ and $R_{a4}$ are each independently a single bond, or an alkylene group of 1 to 10 carbon atoms,
$R_{a2}$ and $R_{a3}$ are each independently an alkyl group of 1 to 10 carbon atoms,
$R_{a5}$ is a hydrogen atom, an alkyl group of 1 to 10 carbon atoms, or a divalent, trivalent or tetravalent alkylsilyl group which is substituted with an alkyl group of 1 to 10 carbon atoms,
$n_1$ is an integer of 1 to 3, and
$n_2$ is an integer of 0 to 2,

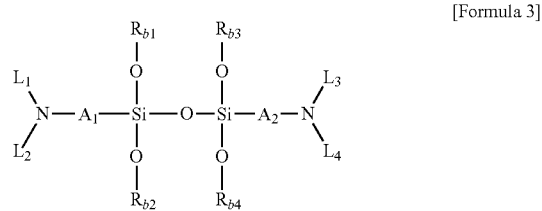

[Formula 3]

in Formula 3,
$A_1$ and $A_2$ are each independently an alkylene group of 1 to 20 carbon atoms,
$R_{b1}$ to $R_{b4}$ are each independently an alkyl group of 1 to 20 carbon atoms, and
$L_1$ to $L_4$ are each independently an alkyl group of 1 to 20 carbon atoms, an aryl group of 6 to 20 carbon atoms, or a divalent, trivalent or tetravalent alkylsilyl group which is substituted with an alkyl group of 1 to 10 carbon atoms.

4. The modified conjugated diene-based polymer of claim 3, wherein in Formula 2, $R_{a1}$ and $R_{a4}$ are each independently a single bond, or an alkylene group of 1 to 5 carbon atoms,
$R_{a2}$ and $R_{a3}$ are each independently an alkyl group of 1 to 5 carbon atoms, and
$R_{a5}$ is a hydrogen atom, an alkyl group of 1 to 5 carbon atoms, or a tetravalent alkylsilyl group which is substituted with an alkyl group of 1 to 5 carbon atoms.

5. The modified conjugated diene-based polymer of claim 3, wherein in Formula 3, $A_1$ and $A_2$ are each independently an alkylene group of 1 to 10 carbon atoms,
$R_{b1}$ to $R_{b4}$ are each independently an alkyl group of 1 to 10 carbon atoms, and
$L_1$ to $L_4$ are each independently an alkyl group of 1 to 10 carbon atoms, an aryl group of 6 to 12 carbon atoms, or a tetravalent alkylsilyl group which is substituted with an alkyl group of 1 to 5 carbon atoms.

6. The modified conjugated diene-based polymer of claim 1, wherein the modified conjugated diene-based polymer has a number average molecular weight (Mn) of 1,000 g/mol to 2,000,000 g/mol, a weight average molecular weight (Mw)

of 1,000 g/mol to 3,000,000 g/mol, and a peak average molecular weight (Mp) of 1,000 g/mol to 3,000,000 g/mol.

7. The modified conjugated diene-based polymer of claim 1, wherein the modified conjugated diene-based polymer has a mooney relaxation ratio of 0.7 to 3.0 when measured at 100° C.

8. The modified conjugated diene-based polymer of claim 1, wherein the modified conjugated diene-based polymer has a shrinking factor of 0.8 to 3.0, the shrinking factor being an average value of a ratio ($[\eta]/[\eta]_o$) of intrinsic viscosity ($[\eta]$) of the polymer at an absolute molecular weight to the intrinsic viscosity ($[\eta]_o$) of a linear polymer at the absolute molecular weight.

9. A rubber composition, comprising:
the modified conjugated diene-based polymer of claim 1; and
a filler.

10. The rubber composition of claim 9, wherein the filler is present in an amount of 0.1 parts by weight to 200 parts by weight based on 100 parts by weight of the modified conjugated diene-based polymer.

11. The rubber composition of claim 9, wherein the filler is a silica-based filler or a carbon black-based filler.

* * * * *